(12) United States Patent
Tan et al.

(10) Patent No.: US 8,949,046 B2
(45) Date of Patent: Feb. 3, 2015

(54) SYSTEM FOR ASSOCIATING INVENTORY WITH HANDLING EQUIPMENT IN SHIPPING CONTAINER YARD INVENTORY TRANSACTIONS

(75) Inventors: Han-Shue Tan, Concord, CA (US); Jihua Huang, Richmond, CA (US); Ke-Ren Chuang, Pleasanton, CA (US); Fanping Bu, Foster City, CA (US); Gregory Keith Warf, Fairfield, CA (US)

(73) Assignee: Mi-Jack Products, Inc., Hazel Crest, IL (US)

( * ) Notice: Subject to any disclaimer, the term of this patent is extended or adjusted under 35 U.S.C. 154(b) by 664 days.

(21) Appl. No.: 12/500,478

(22) Filed: Jul. 9, 2009

(65) Prior Publication Data
US 2011/0010005 A1    Jan. 13, 2011

(51) Int. Cl.
  *G01F 17/00* (2006.01)
  *G06Q 10/08* (2012.01)
  *G06Q 50/28* (2012.01)
  *G06F 11/30* (2006.01)

(52) U.S. Cl.
  CPC .............. *G06Q 10/087* (2013.01); *G06Q 10/08* (2013.01); *G06Q 50/28* (2013.01)
  USPC ................... 702/56; 702/57; 702/58; 702/59; 702/60; 702/182

(58) Field of Classification Search
  CPC ............ G01N 35/00871; G06Q 10/08; G06Q 10/0834
  USPC ...................................... 702/5–606
  See application file for complete search history.

(56) References Cited

U.S. PATENT DOCUMENTS

| 2004/0066328 | A1 | 4/2004 | Galley |
| 2006/0158338 | A1* | 7/2006 | King et al. ............ 340/679 |
| 2007/0222674 | A1* | 9/2007 | Tan et al. .............. 342/357.02 |

OTHER PUBLICATIONS

International Search Report dated Sep. 1, 2010 for Application No. PCT/US10/41526.

* cited by examiner

*Primary Examiner* — Phuong Huynh
(74) *Attorney, Agent, or Firm* — McCracken & Gillen LLC

(57) ABSTRACT

A system is provided to associate containers with handling equipment (HE) in a container storage facility. In the system an operation detector, such as a twistlock sensor that indicates when a container is picked up or dropped off, is installed on a first HE which is a piece of container handling equipment (CHE) that can lift the container. An event detector, such as a vibration sensor or distance measuring radar, is further installed on a second HE that is a tractor with an attached chassis for receiving and transporting a container. The event detector indicates when a container-operation-related event, such as a container pick up or drop off, occurred on the tractor chassis. The two detectors (operation and event) are used by a processor to associate the container with either the CHE or the tractor. The operation and event detectors can further be used in conjunction with position sensors such as a GPS sensor to accurately determine the position of the tractor and the CHE in a container yard. When the position sensors degrade in performance, an additional motion detector such as a speed sensor can be used to determine the tractor's distance from the CHE to locate an appropriate tractor involved in the operation.

30 Claims, 12 Drawing Sheets

SYSTEM FOR ASSOCIATING INVENTORY WITH HANDLING EQUIPMENT IN SHIPPING CONTAINER YARD INVENTORY TRANSACTIONS

BACKGROUND

1. Technical Field

The present invention relates to an inventory tracking system used in a shipping container storage yard. More particularly, the present invention relates to the association of inventory handling equipment (HE) used to move containers in a shipping container storage yard with the containers moved by the HE as located by the inventory tracking system.

2. Related Art

Over the recent decade, the number of shipping containers handled in container yards has increased dramatically. To improve the efficiency of container terminal material handling processes, inventory tracking systems have been developed to track and monitor what really takes place in the yard. Such an inventory tracking system can employ real-time positioning technology (such as Global Positioning System (GPS) and Real-time Locating System (RTLS)) and wireless communications to track locations of containers by actively tracking the movement and locations of container handling equipment (HEs) that pick up, move, and set down the containers. The inventory tracking system then records the tracking information to an inventory tracking database and interfaces with a Terminal Operating System (TOS) to update container locations whenever a HE picks up or sets down a container. Such inventory tracking systems are designed to improve the accuracy of the container yard inventory and thereby reduce lost containers, maximize TOS performance, and improve the efficiency of HEs.

HEs can be categorized into two broad types: (1) lift equipment—any type of HE that is capable of lifting a container and setting it down on the ground, on top of another container, or onto another HE for transportation, and (2) transport equipment—any type of HE that is capable of moving a container from one location to another but is not capable of lifting the container and setting it down. Typical lift equipment includes top picks (also referred to as top lifts or top loaders), side picks (also referred to as side lifts, side loaders or empty handlers), reach stackers, straddle carriers, rubber tired gantries (RTGs), rail mounted gantries (RMGs), and quay cranes. Typical transport equipment includes over-the-road (OTR) trucks and tractors (also referred to as yard tractor, tug, UTR (Universal Tractor Ross), jockey truck, hustler, yard hustler, etc.). Both OTR trucks and tractors can have an attached chassis (also referred to as street chassis, trailer, bomb cart, yard chassis, terminal trailer, and so on) which are capable of carrying one or more containers.

In this description, lift equipment is referred to as container handling equipment (CHE) and transport equipment is referred to as tractor-type HE or simply as tractors. And HE is used for both CHE and tractors.

Since inventory tracking systems track the containers by tracking pieces of HE, it is critical to ensure that the association between a container and the HE that moves it is correct. For example, assume a CHE or a unit of lift equipment picks up a container, Container C1 so labeled for purposes of discussion, from its location in a shipping yard and puts it onto the chassis of a tractor labeled Tractor1 for this discussion. The system then associates Container C1 with Tractor1 and identifies the location of Tractor1 as the location of Container C1 until the next transaction on Container C1.

Next consider a situation where the CHE sets down Container C1 onto the chassis of Tractor1, but there happens to be another tractor, Tractor2, right behind Tractor1 waiting for its turn to receive a container. Further assume that due to errors in the positioning sensors and therefore errors in the position estimates of the two tractors, the position estimate of Tractor2 appears to be closer to that of the CHE than the position estimate of Tractor1. The system identifies Tractor2 as the tractor that receives Container C1 from the CHE and associates Container C1 with Tractor2. As a result, the system assigns the location of Tractor2 as the location of Container C1, while in reality Container C1 is on top of Tractor1. Moreover, the error propagates since such an erroneous association leads to erroneous associations in subsequent transactions on Container C1. Thus, erroneous tracking and location information has been generated due to incorrect associations between containers and HEs.

To ensure correct association between containers and HEs, the inventory tracking system needs to correctly identify the HEs involved in each container inventory transaction. Typically, the inventory tracking system recognizes a container transaction based on information from sensors such as the twistlock sensors/switches. Twistlocks are mechanisms installed at the four corners of a CHE's spreader bar to secure containers in transit on the CHEs. Twistlock systems include electronic components (e.g., motors, control circuits, and sensors/switches) to enable remote operation of the mechanical components. Two types of sensors/switches are typically used to facilitate the operation of an electronic twistlock. For the convenience of description, these two types of sensors/switches are referred to herein as twistlock contact sensors and twistlock engagement switches. When a CHE picks up or sets down a container, these twistlock sensors/switches change their outputs or status indication. For example, before a CHE picks up a container, all four twistlocks at the four corners of the spreader bar of the CHE must be engaged to secure the container onto the spreader bar for lifting; as the twistlocks are engaged, their corresponding twistlock engagement switches will change their status from "disengaged" (or "unlocked") to "engaged" (or "locked") to indicate the engagement of the twistlock. Based on this change, the CHE can detect the occurrence of a container pickup operation and report to the inventory tracking system its own ID, the pickup operation, and the time the operation occurs. Similarly, when a CHE sets down a container, the twistlocks are disengaged to release the container from the spreader bar, which leads to a change from "engaged" (or "locked") to "disengaged" (or "unlocked") in the status of twistlock engagement switches. Thus, the inventory tracking system in this way obtains information regarding the operation (picking up or dropping off) and the CHE that performs the operation. The correct association between containers and HEs then hinges on the correct recognition of the tractors that receive or provide the containers.

To ensure correct association between containers and HEs, some prior art inventory tracking systems have transponders and readers installed on the HEs. In one prior art system, transponders are installed on tractors while readers are installed on CHEs. Whenever a CHE picks up a container from (or drops off a container onto) the chassis of a tractor, the readers on the CHE read the transponders on the tractor and identify the tractor based on the information (e.g., tractor ID) from the transponders. However, such transponder-reader-based mechanisms require line of sight or close proximity for readers to read transponders. Despite the fact that multiple readers/transponders are typically installed on each HE to maximize the possibility of line of sight/proximity (which results in a higher cost), readers often still fail to detect transponders on tractors. Moreover, the transponder-reader-based mechanisms are vulnerable to interference and require a relatively high level of maintenance.

Other prior art inventory tracking systems install bar codes on tractors and scanners (or cameras) on CHEs. Similar to transponder-reader-based mechanisms, the scanners (or cameras) on a CHE read the bar codes on the tractor and the tractor is identified based on the bar codes. The drawbacks of such mechanisms include the line-of-sight requirement, performance degradation due to bad weather (especially if cameras are used) as well as damage to or soiling of the bar code (making it unreadable). In addition, the location of the bar codes can also be a problem. For example, a bar code on the side of a tractor can be difficult for a crane, which is much taller than a tractor, to read. Also a bar code on top of a tractor is difficult for a top pick, which is not much higher than a tractor, to read. To solve this problem scanners or cameras can be installed on a top pick's spreader bar, which can be much higher than a tractor, but scanners or cameras installed on a spreader bar are prone to damage.

Some other inventory tracking systems simply employ higher-accuracy positioning sensors such as GPS sensors to improve the positioning accuracy; however, this solution leads to a (significantly) higher cost. Furthermore, the improvement in accuracy is still limited due to the harsh environment for the positioning sensors. For a GPS-based positioning system, multipath and long periods of GPS blockage are common in a canyon-like environment formed by stacked containers surrounding the tractors, which limit the achievable accuracy even for a higher-accuracy GPS (or DGPS).

SUMMARY

In accordance with the embodiments of the present invention, an event detection apparatus, adapted for use with transport equipment (i.e., tractors) is provided for detecting container-operation-related events occurring to tractors in a container yard. In one embodiment, the event detection apparatus includes a vibration detector for measuring vibrations of the tractor and a processor for receiving information from the vibration detector and detecting container-operation-related events occurring to the tractor.

The container-operation-related events detected by the processor of the event detection apparatus can include two types of events: a container pick up from the chassis attached to the tractor and a container drop off onto the chassis of the tractor. More specifically, the container-operation-related events can include at least one of the following eight types of events: (1) a container drop off in the middle of the chassis attached to the tractor, (2) a container drop off at the front of the chassis, (3) a container drop off at the rear of the chassis, (4) a container pick up in the middle of the chassis, (5) a container pick up at the front of the chassis, (6) a container pick up at the rear of the chassis, (7) chassis engagement (i.e., attachment of a chassis to the tractor), and (8) chassis disengagement (i.e., separation of a chassis from the tractor).

In one embodiment, the processor detects the occurrence of container-operation-related events by collecting vibration measurements from the vibration detector when the vibration measurements are relatively large (indicating a possible occurrence of a container-operation-related event). The processor further maintains awareness of the loading status of the tractor based on the detection of container-operation-related events. In a further embodiment, the event detection apparatus also includes a speed detector for providing information pertaining to whether the tractor is at near-zero speed including zero speed. Since container-operation-related events do not occur unless the tractor is stopped or almost stopped, the event detection apparatus only collects vibration measurements when the tractor is at near-zero speed including zero speed.

In one separate embodiment, the event detection apparatus includes a container-presence or position detector and a processor. The container-presence detector detects the presence of at least one container on a chassis of the tractor without determining a distance from the tractor cab to the position of the container on the cab. Alternatively, with a position detector such as a radar system, LIDAR or other distance-measuring device, a measurement of the distance between the tractor cab and container can be provided to determine the location of one or more containers placed on the chassis. The presence detector, such as a camera or a radar device with a short range can still determine a location of the container on the chassis without measuring distance. The camera can be angled to only detect presence when the chassis is on a front portion, rather than rear portion of the chassis. Similarly, a short-range radar device can determine when a container is on the front of the chassis, but not the rear, and in combination with a vibration detector can determine where a container is located on the chassis. The processor receives the status of presence and in some cases the distance and detects container-operation-related events occurring to the tractor based on changes in the status of presence as well as the distances before and after the changes.

A further embodiment of the present invention includes an inventory association method for associating containers with HEs in a container storage facility. The inventory association system includes an operation detector (such as a twistlock sensor that indicates when a container is picked up or dropped off) installed on a CHE (which can lift and transport a container), an event detector (such as a vibration detection sensor) installed on a tractor (which can have a chassis attached to it for receiving and transporting a container), a communication link, and a processor for associating containers with HEs. The operation detector provides information indicating an occurrence of a container operation conducted by the CHE, and the container operation includes at least two types: a container pickup operation and a container drop off operation. The event detector provides information indicating an occurrence of a container-operation-related event occurring to the tractor, and the container-operation-related event includes at least two types: a container pick up from the chassis and a container drop off onto the chassis. The communication link connects the operation detector and the event detector with the processor for transmitting information from these two detectors to the processor.

In method steps with the operation detector and event detector, the processor detects an occurrence of a container operation as well as relevant information including an operation type and a time of occurrence based on the information from the operation detector. The processor also detects an occurrence of a container-operation-related event as well as relevant information including an event type and a time of occurrence based on the information from the event detector. Subsequently, the processor determines whether the container-operation-event matches the container operation by comparing the event type with the operation type and by comparing the time of occurrence for the event with the time of occurrence for the operation. If a match is found, the processor further associates the container originally associated with one of the two HEs with the other based on at least one of the two types: the operation type or the event type.

In another embodiment that relies on CHE position provided either in conjunction with the event detector or separate from it, the inventory association system includes a first mobile unit on a CHE for determining the CHE's position and occurrences of container operations performed by the CHE, a second mobile unit on a tractor for determining the tractor's position and motion (e.g., speed). The system further includes a processor for associating containers with the HEs, and a communication link between the first and second mobile units and the processor to enable information exchange.

In this embodiment, the first mobile unit can include a first positioning unit for providing first positions of the CHE and an operation detector for providing information indicating an occurrence of a container operation performed by the CHE. The second mobile unit can include a second positioning unit for providing second positions of the tractor as well as confidence levels of the second positions and a motion detector for providing information pertaining to motion of the tractor. The first and second positioning units can include devices such as a GPS sensor, a transponder, or a similar device for identifying HE positions. The motion detector in the second mobile unit can be a speed sensor or an accelerometer for determining the tractor's motion, which can be used to determine a distance from a last trustworthy position when the confidence levels of the second positions are relatively low. The processor of the inventory association system then detects an occurrence of a container operation based on the information from the operation detector and determines the location of the container operation based on the first positions. The processor further determines whether the tractor is involved in the container operation based on the location of operation, the operation type, the second positions, and the distance from the last trustworthy position of the tractor. If the tractor is determined to be involved in the container operation, the processor further associates the container in the container operation with either the CHE or the tractor based on the operation type.

BRIEF DESCRIPTION OF THE DRAWINGS

Further details of the present invention are explained with the help of the attached drawings in which.

DETAILED DESCRIPTION

A. System Overview

Figure 1A:
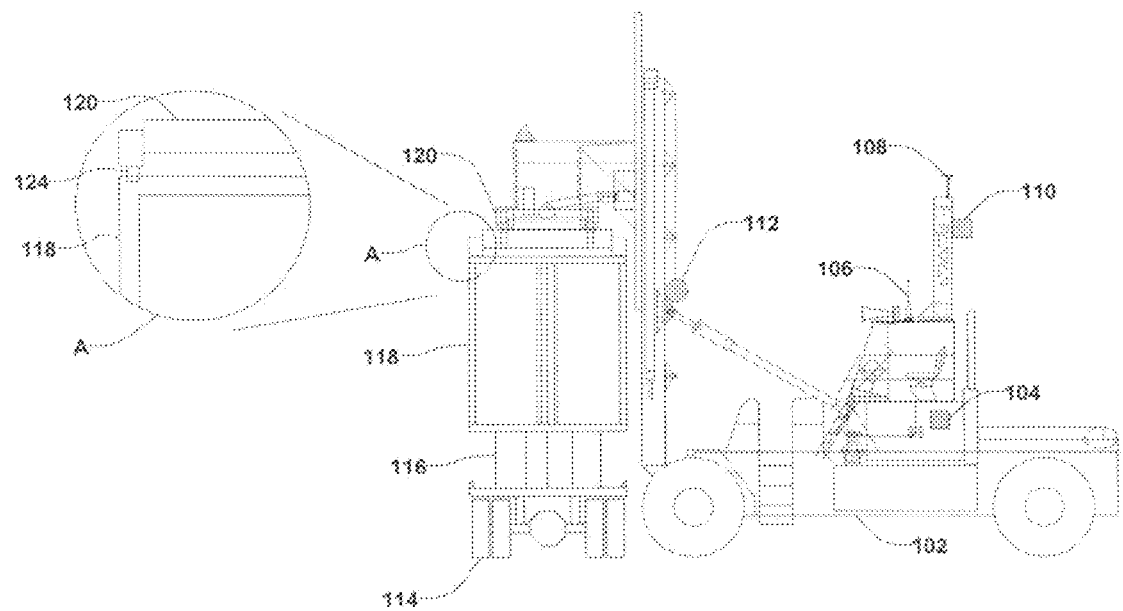
FIGS. 1A and 1B illustrate a container inventory transaction, where a CHE has just picked up a container from or is about to drop a container off onto the chassis of a tractor. Components of a GPS-based inventory tracking system are also shown in the figures.
Figure 1B:
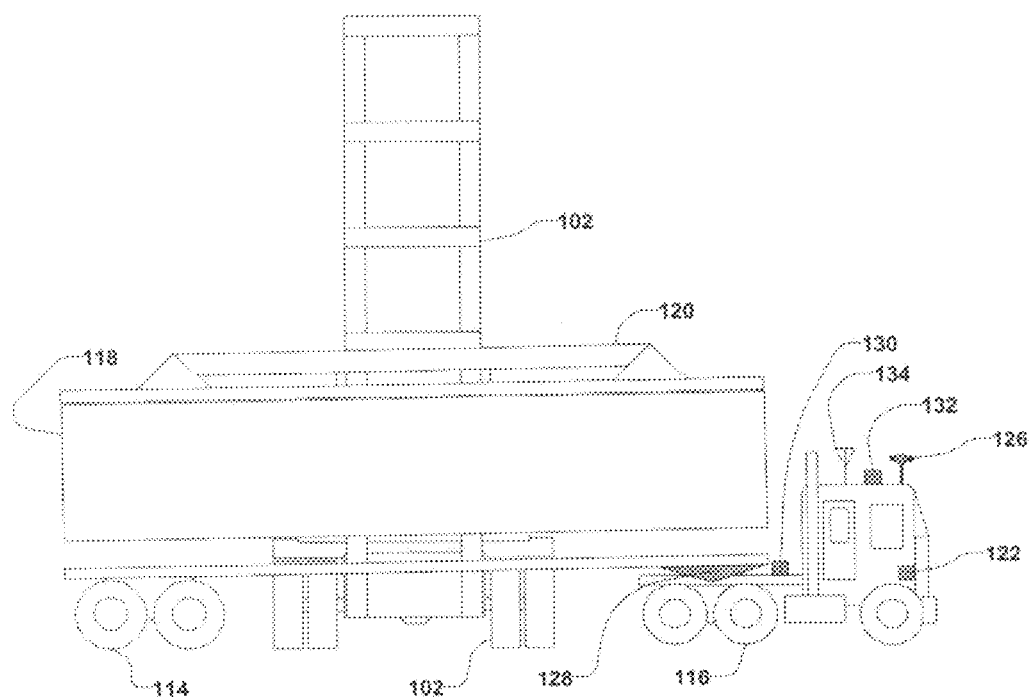

FIGS. 1A and 1B provide two views of a container inventory transaction, where a container handling equipment (CHE) 102 has just lifted a container 118 from or is going to set down a container 118 onto the chassis 114 (i.e., the terminal trailer or the bomb cart) of a tractor 116. Let's assume the CHE 102 (a top pick 102 in this example) has just lifted the container 118. During this container pickup operation, the operator of the CHE 102 first extends or contracts the spreader bar 120 to the appropriate length (10, 20, 30, or 40 feet) based on the length of the container 118. The operator then lowers the spreader bar 120 onto the top of the container 118 so that all of the four twistlocks 124 at the four corners of the spreader bar 120 are inserted into the container's twist lock receptor holes and the spreader bar 120 is firmly seated on top of the container. At this point, the twistlock contact sensors that are installed at the four corners of the spreader bar detect the proper seating of the twistlocks and change their outputs (e.g., from "detached" to "contacted") to indicate that the twistlocks are in place. (No weight is exerted on the twistlock mechanism yet since the twistlock has not been engaged but the twistlocks are placed in a location where engagement of the locks can occur. Based on the contact information from the twistlock contact sensors, the CHE operator will be informed (e.g., via a visual indication such as a lighted bulb lamp or LED) that the twistlocks are in place; the CHE operator can then engage the electronic twistlocks remotely, typically via a button or switch in the driver's cab. At this point, the twistlock engagement switches, a type of switch integrated into the electronic twistlock system, change their status (e.g., from "unengaged" to "engaged"). After all of the four twistlocks are successfully engaged (i.e., all of the four twistlock engagement switches change their status to "engaged"), the operator will be informed (e.g., via a visual indication) that it is now safe to lift the container. Once the CHE 102 has lifted the container from the chassis 114 of the tractor 116, the container 118 will be suspended by the twistlocks and there will be a small gap between the spreader bar 120 and the top of the container 118; therefore, the twistlock contact sensors will change their values back to "detached" while the twistlock engagement switches will remain as "engaged".

When the CHE 102 moves the container 118 to its destination and sets it down, the spreader bar 120 will once again firmly seat on top of the container 118, which triggers the twistlock contact sensors to change from "detached" to "contacted". Upon receiving this information (e.g., via visual display), the CHE operator can then disengage the twistlocks, typically via a button or switch in the driver's cab. Subsequently, all of the twistlock engagement switches change their status to "disengaged"; the CHE operator can then lift the spreader bar 120 up to release the container, which triggers the twistlock contact sensors to change their status back to "detached". The CHE operator then moves the spreader bar 120 away, and at this point, the twistlock contact sensors keep their status as "detached" while the twistlock engagement switches remain as "disengaged" until the next operation.

FIG. 1A also shows a GPS-based inventory tracking system, in which the CHE is equipped with a GPS receiver 108, a communication unit 106 and a processor 104. The CHE 102 is further equipped with twistlock sensors (installed on the spreader bar 120 or embedded in the twistlocks 124) and a height sensor 112. The CHE 102 may also be equipped with an inertial measurement unit (IMU) 110. The processor 104 processes the measurements from the GPS 108 and the IMU 110 to provide position estimates of the CHE 102; the processor 104 further communicates the position estimates as well as other information (e.g., outputs of the twistlock sensors and the height sensor 112) via the communication unit 106 to a central processor (not shown in FIG. 1A), which further processes and stores the relevant information into an inventory tracking database (also not shown in FIG. 1A). Similarly, as shown in FIG. 1B, the tractor 116 is equipped with a GPS receiver 126, an IMU 132, a communication unit 134 and a processor 122, and the processor 122 provides position estimates of the tractor 116 based on the measurements from the GPS 126 and the IMU 132. The processor 122 further communications the position estimates as well as other information to the central processor (not shown in FIG. 1B)

Also shown in FIG. 1A, and in more detail in the rotated view of FIG. 1B are the schematic structure of the tractor 116 with the chassis 114 and the top pick 102 holding a container 118. The chassis 114 is typically attached to the tractor 116 through a fifth wheel coupling mechanism (not shown), which includes a coupling pin (or king pin) on the front of the chassis and a horseshoe-shaped coupling device called a fifth wheel 128 (shown only in view of FIG. 1B) on the rear of the tractor 116. The fifth wheel sensor 130 (shown in the view of FIG. 1B) provides the status of the fifth wheel coupling (coupled or not) and it may also provide information such as the height of the coupling, the position of the king pin, and the status of the lock on the king pin.

Since shipping containers usually are relatively heavy (even when they are empty), there will be relatively significant impact to a chassis 114 when a CHE 102 lifts a container 118 from or sets a container down onto the chassis 114. Since the chassis 114 is attached to the tractor 116 via a fifth wheel coupling, which does little to damp the impact, such an impact causes the tractor 116 to vibrate (both vertically and in the pitch motion) for a short period of time. Furthermore, the vibration patterns depend on the type of the operation (picking up or dropping off a container 118), the weight of the container, and the location of the container on the chassis. For example, the standard chassis is typically 40 ft long, which is large enough for one long container (typically 40 ft or 45 ft) or two short containers (typically 20 ft in length). Setting down a 20 ft container on the front portion of the chassis causes a vibration pattern different from that caused by setting down a 20 ft container onto the rear portion of the chassis. Hence, the vibration patterns of the tractor 116 can be used to detect the occurrence of a container-related operation, the type of operation, and whether the operation is related to a long container, a short container at the front portion, or a short container at the rear portion of the chassis 114.

B. Event Detection System

1. Event Detection System Based on Vibrations

Figure 2:
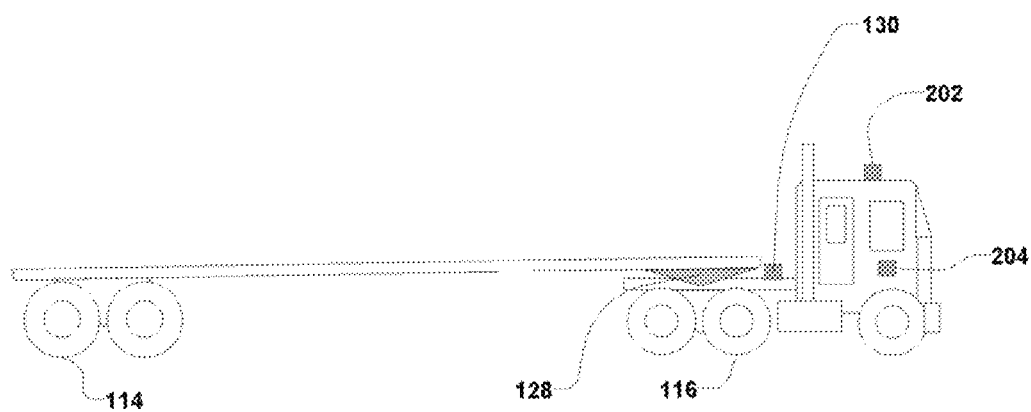
FIG. 2 shows a first embodiment of an event detection apparatus installed on a tractor, which is capable of detecting container-operation-related events occurring to the tractor based on the vibration pattern of the tractor.

FIG. 2 shows a first embodiment of an event detection apparatus installed on a tractor, which is capable of detecting container-operation-related events occurring to the tractor based on the vibration pattern of the tractor. In this embodiment, the event detection apparatus includes a vibration detector 202 for detecting and measuring vibrations (which is possibly induced by the container-operation-related events) and a processor 204 for receiving information from the vibration detector 202 and for determining the occurrence of events. The operation-related events can include at least two types of events such as a container pick up from the chassis and a container drop off onto the chassis. More specifically, the container-operation-related events can include the following six types: (1) a container drop off in the middle of the chassis, (2) a (short) container drop off at the front of the chassis, (3) a (short) container drop off at the rear of the chassis, (4) a container pick up in the middle of the chassis, (5) a (short) container pick up at the front of the chassis, and (6) a (short) container pick up at the rear of the chassis. In another embodiment, the event types can further include chassis engagement and chassis disengagement, which indicate that a chassis is being attached to or separated from the tractor, respectively.

The vibration detector 202 for detecting and measuring vibrations of the tractor can be a sound detector that detects sounds caused by the impact of a container operation, an accelerometer that detects the vertical motion of the tractor, a height sensor that detects the vertical motion of the tractor by measuring the height from the mounting location to the ground, an angular motion sensor that detects the pitch motion of the tractor, or an IMU that includes an accelerometer and/or an angular motion sensor. The processor 204 on the tractor then determines whether a container-operation-related event has occurred based on the (vertical or angular) vibrations measured by the vibration detector 202.

Figure 3:
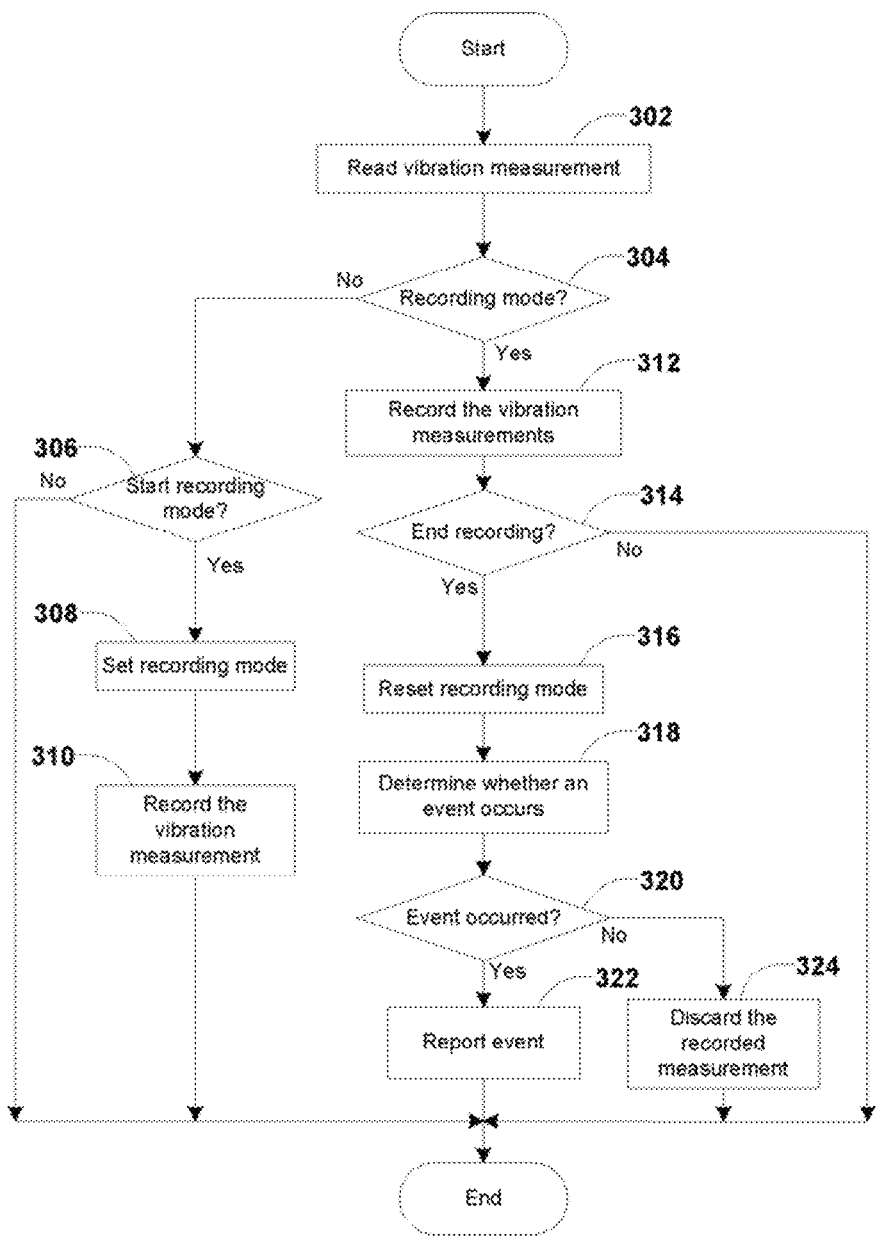
FIG. 3 is a flowchart showing the process involved in one embodiment of the event detection apparatus for detecting container-operation-related events occurring to the tractor based on the vibration pattern of the tractor.

FIG. 3 is a flowchart showing a process employed by the processor 204 on the tractor to detect an occurrence of a container-operation-related event. The process starts by reading the vibration measurement from the vibration detector 202 at step 302 and determining whether the process is in a recording mode at step 304.

Since vibrations caused by an impact due to a container operation usually last for a short period of time, it can be desirable to collect the vibration measurements in the whole period for analysis. Alternatively, real-time processing of the vibration measurements can be designed to process each vibration measurement in each processing cycle without recording the vibration measurements. In the process shown in FIG. 3, the vibration measurements are recorded and then processed. A recording mode is devised for this purpose and a Boolean variable, e.g., recording mode, is used to indicate whether the recording mode is active or not. This Boolean variable is initialized to be 0 (meaning not in a recording mode) when the system first starts.

Referring to step 304, if the Boolean variable is 0 (e.g., recording_mode=0), the process is not in a recording mode and the processor will then proceed to step 306, in which the process determines whether a recording mode should be started based on the magnitude of the current vibration measurement. If the current vibration measurement is relatively small (e.g., smaller than threshold_start, a pre-set threshold selected based on the minimum impact of container operations), no events are determined to have occurred and the process ends and waits for the next processing cycle to start from step 302 again. The processing cycle is set to occur at a frequency to assure detection of a vibration. The processing cycle can be set the same as (or longer than) the rate of the measurements from the vibration detector. For example, if the rate of the measurements is 0.1 s, the processor executes the process as shown in FIG. 3 every 0.1 s or a little longer.

If the current vibration measurement is relatively large (e.g., larger than the pre-set threshold), indicating a likelihood of a container-operation-related event, the process determines that a recording mode should be started and proceeds to step 308 to set the Boolean variable to 1 (e.g., to set recording_mode=1). The process then stores the current vibration measurement together with other information including the current speed measurement and the current time at step 310. Subsequently, the process ends its current cycle and waits till the next processing cycle to start again at step 302.

If at step 304, the process recognizes that it is in a recording mode (e.g., based on recording_mode=1), the process stores the current vibration measurement together with other information including the current speed (if available) and the current time at step 312. The process further determines whether the vibration has settled and the recording mode should be ended at step 314. In one embodiment, the determination is based on the vibration measurements during a pre-defined duration, e.g., between time (t−T) to time t, where time t is the current time and T is the pre-defined duration. That is, if all of the vibration measurements collected between time t−T and time t are all smaller than a pre-defined threshold (e.g., threshold_end), the process considers the vibration has settled down and proceeds to step 320 to end the recording mode by resetting the Boolean variable to 0 (i.e., recording_mode=0). If the vibration has not settled, the process will not end the recording mode and simply exits to wait for the next processing cycle to start at step 302 again.

Once the vibration has settled (as determined at step 314) and the recoding mode has been reset (at step 316), the process then determines whether a container-operation-related event has occurred based on the collected vibration measurements at step 318. Further details of the determination will be described later with FIG. 4. If an event is detected at step 318, the process continues to step 322 through step 320 to report the event together with other relevant information including the type of the event and the time the event occurred. In one embodiment, the process creates an event table to record such information, and at step 322, the process will then add a line entry to the event table to record the newly detected event. If the process determines that the vibration is not caused by a container operation, it continues to step 324 to discard the collected measurement and then exits to wait for the next processing cycle.

Figure 4A:
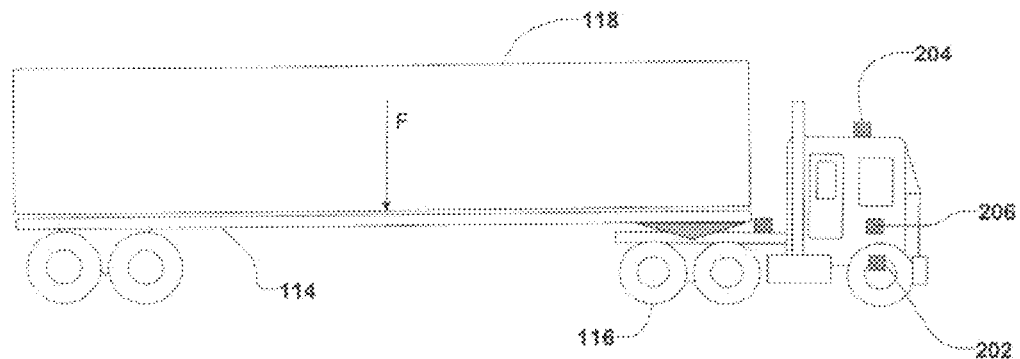
FIGS. 4A, 4B, and 4C illustrate three container-operation-related events corresponding to the following three cases: (1) a 40 ft or 45 ft container has been dropped onto the chassis of a tractor, (2) a 20 ft container has been dropped onto the front portion of the chassis, and (3) a 20 ft container has been dropped onto the rear portion of the chassis.
Figure 4B:
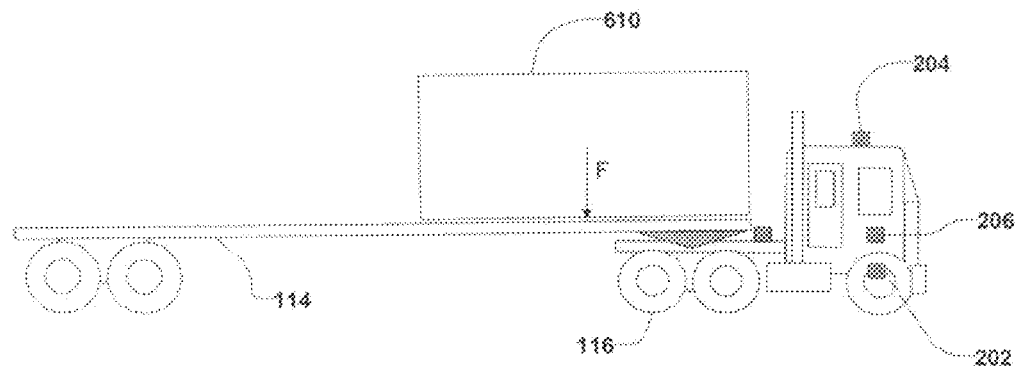
Figure 4C:
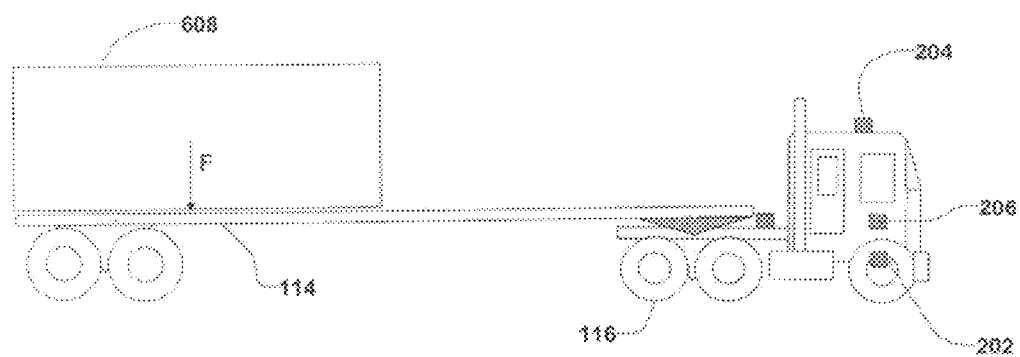

Referring back to step 318, where the process determines whether a container-operation-related event has occurred. In one embodiment, there are at least six types of events. FIGS. 4A-4C illustrate the first three in these six types: (1) a container drop off in the middle of the chassis (FIG. 4A), (2) a (short) container drop off at the front of the chassis (FIG. 4B), (3) a (short) container drop off at the rear of the chassis (FIG. 4C), (4) a container pick up in the middle of the chassis, (5) a (short) container pick up at the front of the chassis, and (6) a (short) container pick up at the rear of the chassis. In another embodiment, the event types can further include chassis engagement and chassis disengagement.

Events of different event types cause a tractor to vibrate differently, resulting in different vibration patterns that can be used to determine not only the occurrence of an event but also the type of the event. Due to the fact that a picking up operation and a dropping off operation go through different operation processes, the vibrations induced by a picking up operation are distinctively different from those induced by a dropping off operation. More specifically, a picking up operation requires the CHE to first land the spreader bar on the container, then engage the twistlocks, and finally lift the container up, while a dropping off operation requires the CHE to first set the container down onto the chassis, disengage the twistlocks, and then pull the spreader bar up and away. As a result, the difference in the action sequence creates different signatures in the vibration patterns. Furthermore, the magnitude, frequency, and damping of the vibrations depend on the weight and size of the container and the location of the container (i.e., the middle, the front, or the rear of the chassis). Thus, by examining the signatures in the sequence, magnitude, frequency, damping factor, and duration of a vibration pattern (which is collected during a recording mode), the processor 202 on the tractor can detect whether an event has occurred and determine which of the six events occurred.

In one embodiment, the event detection at step 318 employs pattern recognition techniques via a two-stage process. At the first stage, the vibration measurements collected during one recording mode are processed to extract signatures (or features) that are representative of the vibrations. Both time-domain and frequency-domain analysis can be applied, which include but are not limited to the following: model-based time-series analysis, principal components analysis (PCA), singular spectrum analysis, continuous wavelet transform, Fractional Fourier transform and linear and nonlinear statistical regression techniques.

At the second stage, the extracted features are input to a pre-designed classifier (or a set of classifiers), which classify the vibration pattern (as represented by the extracted features) into one of eight classes, including six classes corresponding to the six types of events, a seventh class representing that no event has occurred, and an eighth class representing a "can't decide" decision. In another embodiment, the classifier can classify the vibration pattern into one of ten classes, including the eight classes mentioned above and two classes for the two event types: chassis engagement and chassis disengagement. In an alternative embodiment, instead of classifying the vibration pattern into a definitive class, the classifier determines a likelihood vector which includes the likelihood that the vibration pattern belongs to each of the classes. In yet another embodiment, the "can't decide" class can be discarded and only the remaining seven classes are used. The design of the classifier is based on vibration data collected in experiments where the associated events are known. Various classification techniques can be used for the classifier design, such as fuzzy logic, clustering, neural networks (NN), self-organizing maps (SOM) and simple threshold-base logic. These techniques and the processes for classifier design are well-known to those skilled in the art and are therefore not included in this description.

In another embodiment, the event detection at step 318 can use a dynamic model to represent vibrations associated with container-operation-related events. In one non-limiting example, the model is of the form: $y(t-t_{event})=f(F_{impact}, L_{impact}, t-t_{event}, n_{noise})$, where y is the vibration signal that is measured, t is the current time, $t_{event}$ is the time the event first starts (i.e., the time of the recording mode starts), $F_{impact}$ is the impact force due to the container operation (or chassis engagement/disengagement), $L_{impact}$ is the (equivalent) location of the impact force, and $n_{noise}$ represents the measurement noises. The design of such a dynamic model involves developing a model structure based on physics of the tractor-chassis system and identifying model parameters based on data collected in experiments where the event types are known. Since the design process for dynamic models is well-known to those skilled in the art, it is not described in detail herein.

With the pre-determined model, the event detection at step 318 then fits the vibration measurements into the model to identify $F_{impact}$ and $L_{impact}$ by solving the following equation:

$$\begin{bmatrix} y_m(t_1 - t_{event}) \\ y_m(t_2 - t_{event}) \\ \vdots \\ y_m(t_n - t_{event}) \end{bmatrix} = \begin{bmatrix} f(F_{impact}, L_{impact}, t_1 - t_{event}, w_{noise}) \\ f(F_{impact}, L_{impact}, t_2 - t_{event}, w_{noise}) \\ \vdots \\ f(F_{impact}, L_{impact}, t_n - t_{event}, w_{noise}) \end{bmatrix},$$

where $y_m(t_i - t_{event})$ is the vibration measurement at time $t_i$.

Subsequently, the event detection at step 318 determines that a container-operation-related event has occurred if the impact force $F_{impact}$ is larger than a pre-determined threshold, and the event type is further determined based on the sign of $F_{impact}$ and the location of the impact, $L_{impact}$. For example, if the impact force $F_{impact}$ is in the direction of gravity and the location of the impact $L_{impact}$ is approximately the center of the chassis, the event type is determined as "a container drop off onto the middle of the chassis".

Variations to the dynamic model as well as the event detection based on the dynamic model can be determined by those skilled in the art. For example, multiple dynamic models can be built, one for each of several event types, and the event detection step 318 can fit the vibration measurements into each of the dynamic models and compare the residual errors. The model that renders the smallest residue error is identified as the model representative of the detected vibrations. In sum, if the impact force $F_{impact}$ corresponding to this model is relatively large (i.e., larger than a pre-determined threshold), a container-operation-related event is detected in step 318 and the event type is determined as a type corresponding to this particular model. In addition to pattern recognition and model matching techniques, other methods such as information-based algorithm, cognitive-based algorithm, and rule based logics can be utilized to analyze the vibrations and to detect container-operation-related events.

In one embodiment, the event detection and event type determination of step 318 can also involve confirming the event detection by checking with previous event histories stored in an event table. For example, in addition to the event information, the event table can further include the load status of the tractor, including no container onboard, one container in the middle, one container at the front, one container at the back, two containers (one at the front and the other at the back), etc. If the current event is detected as a container drop off in the middle of the chassis (e.g., based on the two-stage processing described above), the process then checks the status of the tractor as recorded in the event table, which is the status right before the current event. If the status is empty, the event detection is further confirmed and the process can add the current event to the event table and update the tractor status to "one container in the middle". On the other hand, if the status of the tractor in the event table is "one container at the front", the current event, which is detected as a container drop off in the middle of the chassis, could not have happened. Such a conflict indicates either the previous event or the current event has been detected wrong. The process can then compare the vibration patterns corresponding to these two events and re-assess their types. If the process fails to reconcile the detection decision, it may mark both events as "can't decide" or add a conflict flag to both of them, or it may request inputs from the tractor operator or other observing individual to specify the event types so as to resolve the conflict.

In a further embodiment, the event detection apparatus shown in FIG. 2 can also include a speed detector for providing information pertaining to whether the tractor is at near-zero speed including zero speed. Since the container-operation-related events typically only occur when the tractor is stopped or almost stopped, the processor 204 can then collect vibration measurements for event detection when the speed detector indicates that the tractor is at near-zero speed including zero speed. By doing so, vibrations occurring when the tractor is moving, e.g., vibrations caused by the movement of the tractor and the road disturbances, are excluded, thereby reducing the workload of the processor 204 and further enhancing the event detection accuracy.

The speed detector can be a speed sensor that directly measures the tractor's speed and the processor 204 determines that the tractor is stopped or almost stopped if the speed measurement is at or near zero (i.e., smaller than a threshold such as 0.1 m/s). Alternatively, an average speed can be calculated based on the speed measurements within a pre-defined time period (e.g., $[t-t_w, t]$ where t is the current time and $t_w$ is the duration of the time period) and the processor concludes that the tractor is stopped or almost stopped if this average speed is at or near zero. Alternatively, the speed detector can indicates gear position and the process determines the tractor is stopped if the gear position is put as parked. The speed detector can also be an accelerometer installed on the tractor. Since the movement of the tractor induces relatively small (compared to the impact of container operations) but persistent vibrations, the measurements of the accelerometer allows a determination of whether the tractor is stopped or at near-zero speed. Alternatively, an IMU can be used in place of the accelerometer.

2. Event Detection Based on Changes in Pitch Angle

Figure 5A:
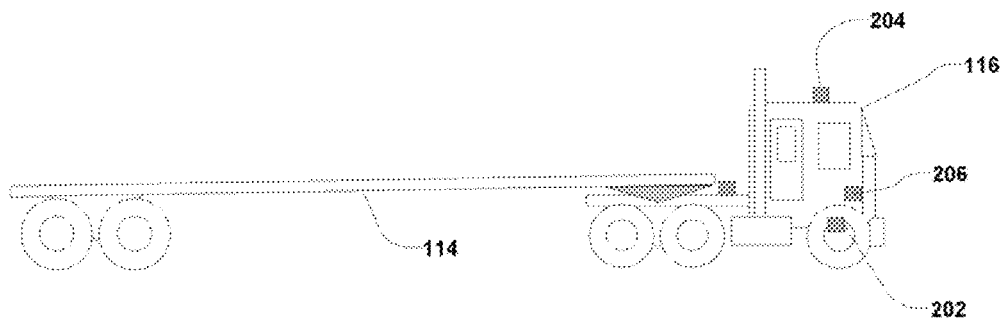
FIGS. 5A and 5B illustrate the steady-state change in the pitch angle of a tractor after a container has been put on top of the chassis of the tractor.
Figure 5B:
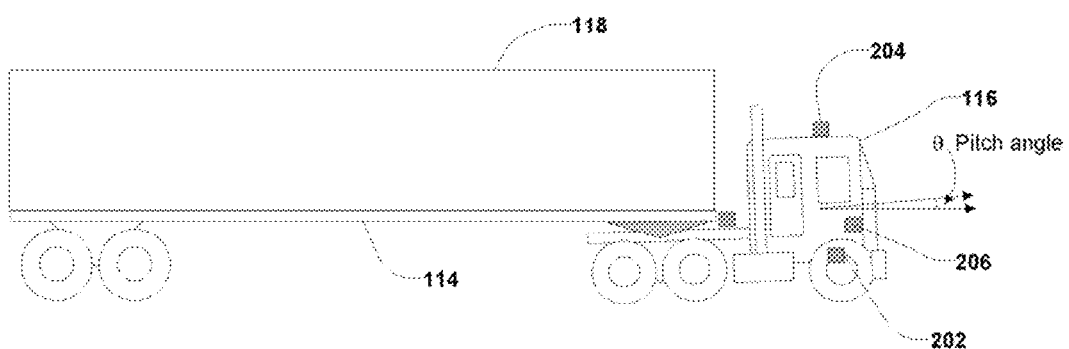

FIGS. 5A and 5B illustrate use of a pitch rate sensor that can be used as the vibration detector to detect vibrations in the pitch motion of the tractor as well as a change in the pitch angle before and after the vibrations. The pitch rate sensor can be used either alone, or in conjunction with a device that measures vibrations as described with respect to FIG. 3. With a pitch rate sensor, the processor 206 on the tractor follows the same process flow as shown in FIG. 3. However, the event detection and event type determination at step 318 are based on the steady-state change in the pitch angle of the tractor instead of (or in addition to) the vibration patterns. FIGS. 5A and 5B together show the steady-state change in pitch angle after a container has been put on top of the chassis of the tractor. FIG. 5A shows the tractor with an un-loaded chassis attached to it and FIG. 5B shows the tractor with a container sitting in the middle of the chassis. Due to the weight of the container, the pitch angle of the tractor increases after a container has been put on top of the chassis of the tractor (FIG. 5B) Therefore, a positive change in the pitch angle after the vibrations have settled indicates a container drop off operation while a negative change indicates a container pickup operation. Thus, at step 318, the process integrates the pitch angle collected during a recording mode. If the magnitude of the change in angle is relatively large (e.g., larger than a pre-determined threshold corresponding to the minimum change a container operation could induce), a container-operation-related event has been detected. The operation is a container drop off operation if the angle change is positive or a container pick up operation if the angle change is negative.

Since the magnitude of the pitch angle change relates to the moment created by the container, which is a combined effect of the weight of the container and the location of the container (i.e., in the middle, at the front, or at the rear of the chassis), additional information is needed if it is desired to further identify the location of the container. In one embodiment, the maximum value of the vibration together with the duration of the vibration (which indicates the frequency and damping of the vibrations) are used to determine the location of the container on the chassis. In another embodiment, two classifiers are designed, one for the container pick up operation and the other for the container drop off operation; each of these two classifiers further classifies the operation into three classes corresponding to the three possible locations of the container on the chassis.

3. Event Detection Based on Container Position Detection

Figure 6A:
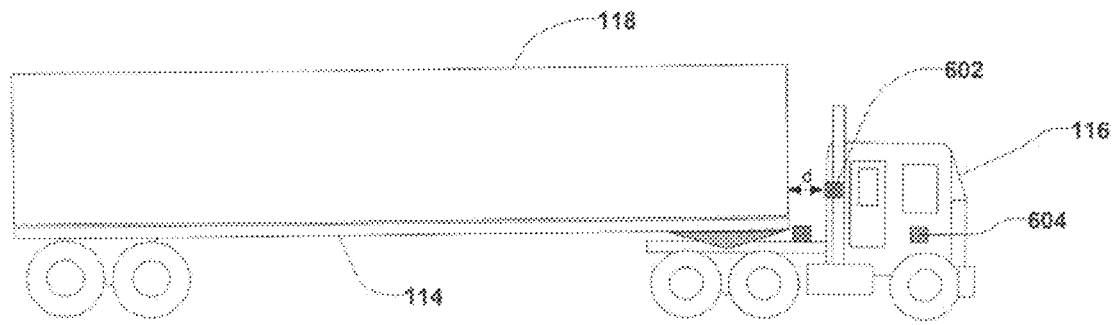
FIGS. 6A, 6B, and 6C illustrate another embodiment of an event detection apparatus installed on a tractor, which detects container-operation-related events occurring to the tractor based on the presence of a container (or containers) as well as the distance between the container and the tractor.
Figure 6B:
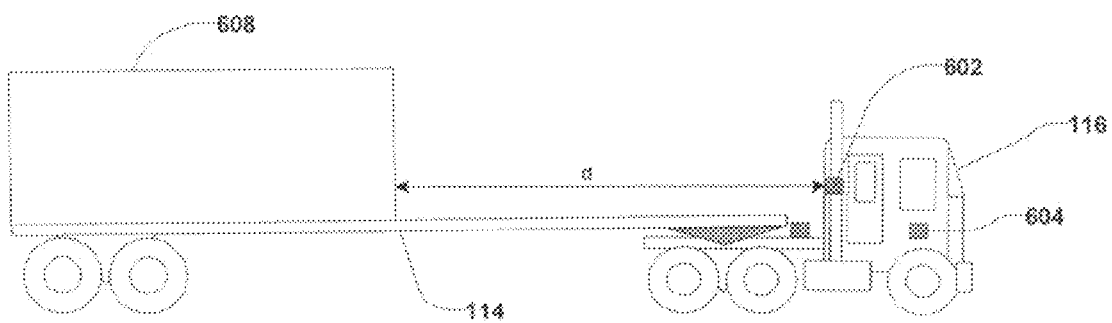
Figure 6C:
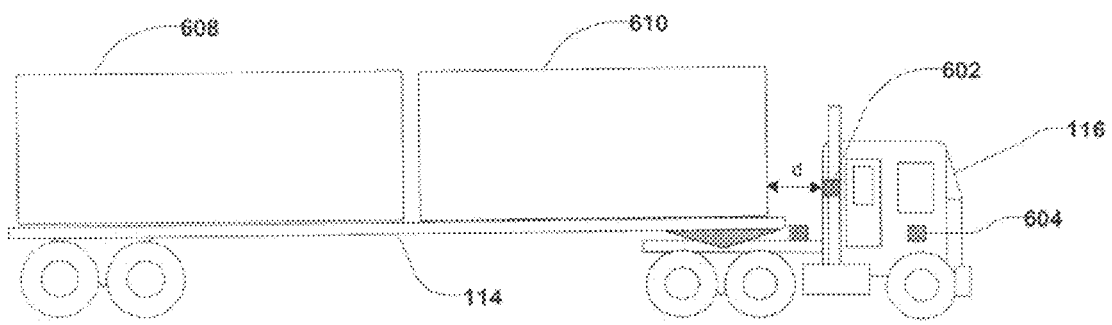

FIGS. 6A-6C illustrate another embodiment of an event detection apparatus installed on a tractor 116 to detect presence of a container on the chassis as well as container position by providing a measurement of the distance between the container 118 (or short containers 608, 610) and the tractor 116. In this embodiment, the event detection apparatus includes a container-position detector 602 for detecting the presence of a container 118 (or containers 608, 610) on the chassis attached to a tractor and for providing a status of presence as well as a distance between the container 118 (or containers 608, 610) and the location of this container-position detector on the tractor, and a processor 604 for detecting container-operation-related events occurring to the tractor based on changes in the status of presence and the distances before and after the changes. The container-position detector 602 can be installed on the tractor 116, facing backwards above the chassis 118; examples of this container-position detector 602 include a radar system, a LIDAR (Light Detection and Ranging), an ultrasonic sensor, and a camera. As illustrated in FIGS. 6A-6C, if there is a container 118 (or there are two containers 608, 610) on top of the chassis, the container-presence detection means detects the container 118 (or the container 610 at the front of the chassis) as a target and provides its distance to the container-presence detector 602 (e.g., at the rear of the tractor 116). Techniques for identifying targets and their locations in radar, LIDAR, and ultrasonic images, as well as image processing techniques used to process camera images for similar purposes are well-known to those skilled in the art; therefore, they are not included in this description.

Since a short container 610 at the front of the chassis 118 can prevent the container-position detector from detecting the presence of a short container 608 at the rear, it can be necessary to require a CHE operator to always put a short (e.g., 20 ft) container at the rear of the chassis before putting a container at the front and to always pick up the container at the front of the chassis before picking up the container at the rear. By enforcing such a protocol, the processor unit 604 is capable of detecting all of the six container pickup and drop off events referenced earlier based on the change in the output (i.e., status of presence) of the container-position detector 602. For example, if the status of presence changes from "no target" to "target" and the distance is small (e.g., smaller than a quarter of the chassis length), a regular (40 ft or 45 ft) container has been dropped off in the middle of the chassis. If the status of presence changes from "no target" to "target" and the distance is relatively large, a short container has been dropped off at the rear of the chassis; if the status of presence remains as "target" but the distance changes from a relatively large distance to a small distance, a short container has been dropped off at the front of the chassis and there are two short containers on top of the chassis. Similarly, the three events corresponding to container pickup operations can be detected.

4. Event Detection with Container Presence Detection

The event detection apparatus as described with FIGS. 2, 5, and 6 can include one or more of many different types of container-presence detectors to improve the accuracy in determining whether the container involved in the event is at the front or the rear of the chassis. A first type of container-presence detector, termed a position detector, includes a radar or LIDAR that can measure a distance from a tractor cab to a container placed on a chassis to determine both its presence and distance to cab. A second type of container-presence detector can have a short detection range and its scanning or detection angle can be small to detect a container presence even if it does not have the capability of measuring the distance from a container to the tractor cab. Examples of such a container-presence detector include short-range ultrasonic sensors, radar, and LIDAR as well as low-resolution cameras. This container-presence detector (or non-position detector) can detect the presence of a container when it is within a certain distance (e.g., one third of the chassis length) to the detector. That is, the container-presence detector can detect a regular container on the chassis (such as the container 118) and a short container at the front of the chassis (such as the short container 610), but it may not detect a short container at the rear of the chassis (such as the short container 608). Alternatively, the container-presence detector can also be a motion detector that detects the movement of a container (during a pickup or drop-off event) within a pre-determined range (e.g., one third of the chassis length).

Even with a long detection range and a relatively large scan angle, a container-presence detector by itself may not be adequate in detecting container-operation-related events that involve a container at the rear of the chassis, especially when there is a container at the front of the chassis blocking its view. However, if a container-operation-related event has already been detected, the container-presence detector can be effective and reliable in supporting the determination of whether a container in the middle, at the front, or at the rear is involved.

Accordingly, for an event detection apparatus with a container-presence detector, the event detection apparatus can first detect a container-operation-related event and determine whether it is a pickup or drop-off event based on detectors such as a vibration detector or a container-position detector. If the container-presence detector detects no container, the container involved in the event should be at the rear of the chassis; if the container-presence detector detects a container, the event involves either a regular container in the middle or a short container at the front. The event detection apparatus can further distinguish these two types based on the load status or the event history of the tractor. For example, if current event is determined to be a drop off event and the previous event was a container drop off at the rear of the chassis, the current event must be a drop off of a short container at the front of the chassis instead of a regular container in the middle of the chassis.

The container-presence detector can be incorporated into an inventory association system to help determine whether the container operation is related to a regular container in the middle of the chassis, a short container at the front, or a short container at the rear. Such inventory association systems can be based on transponders/readers, positioning systems, and other techniques that can be used to make inventory associations. One embodiment of a method for determining the location of a container operation with respect to a chassis includes the following steps. First, the inventory association system detects a container operation performed by a CHE and identifies a tractor as the tractor that provides or receives the container involved in the container operation. The inventory association system then determines the location of the container on the chassis based on a status of presence provided by the container-presence detector installed on the tractor. That is, if the container-presence detector detects a container, the container is determined to be at the front or in the middle of the chassis; otherwise, the container is determined to be at the rear of the chassis. For an embodiment of the container-presence detector that cannot determine distance, the container-presence detector can have a short range that only allows it to detect a container at the front or in the middle of the container. As will be appreciated by those skilled in the art, a container-position detector, which provides both a status of presence and a distance between the container and the tractor, can also be used to determine the location of the container operation with respect to the chassis.

C. Inventory Association System Based on Operation and Event Detection

Figure 7:
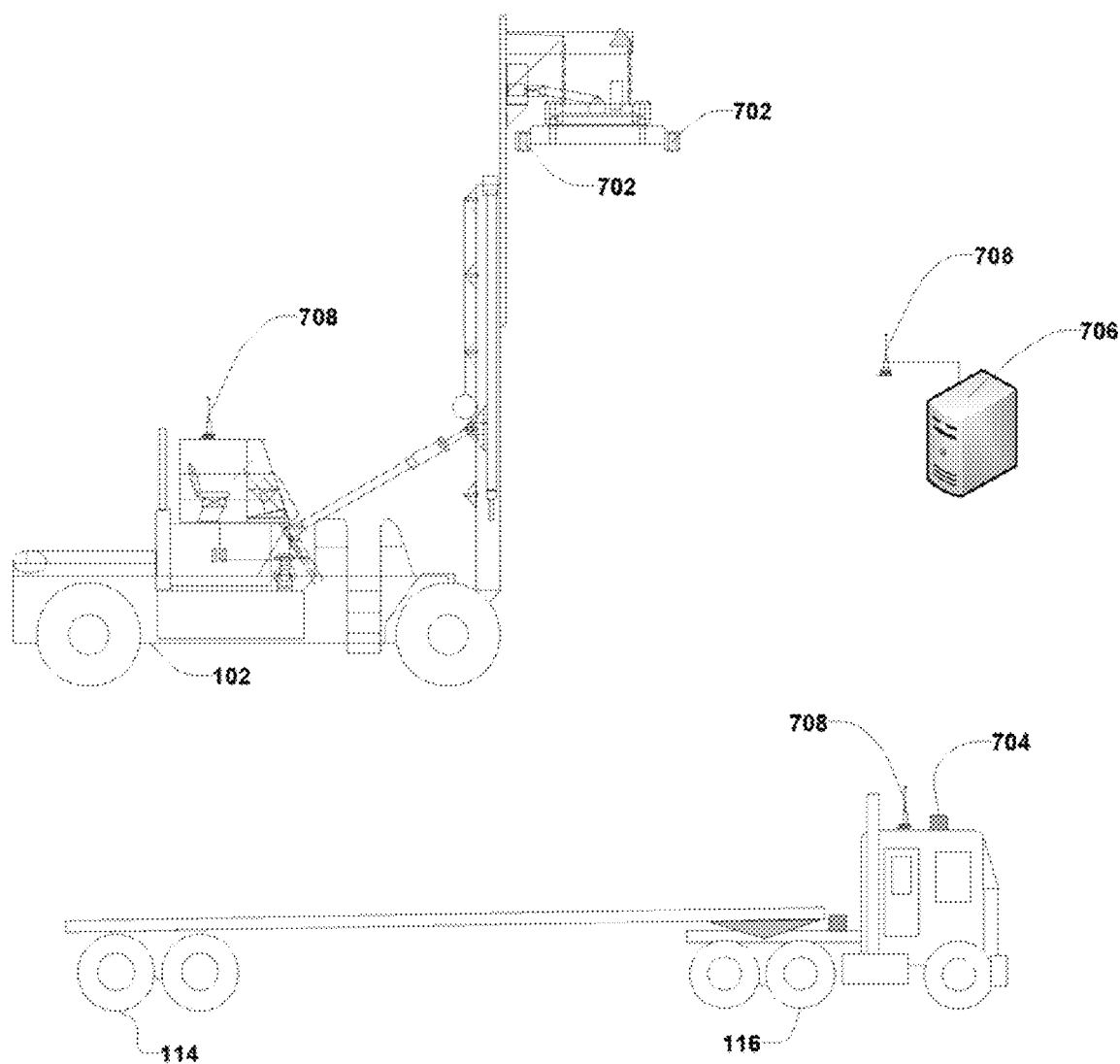
FIG. 7 shows one embodiment of an inventory association system and method for associating containers with HEs.

FIG. 7 shows one embodiment of an inventory association system and method for associating containers with HEs that provide for inventorying containers based on detection of two items occurring on a single container: an operation and an event. First regarding the operation item, in a container shipping yard, there are a number of CHEs and tractors; FIG. 7 shows one CHE 102 and one tractor 116 for illustration purposes. In this embodiment, an operation detector 702 is installed on the CHE 102, providing information indicating an occurrence of a container operation conducted by the CHE. The container operation includes at least two types: a container pickup operation and a container drop off operation. Next for the event, an event detector 704 is installed on the tractor 116 (i.e., HE that can have a chassis attached to it for receiving and transporting a container), providing information indicating an occurrence of a container-operation-related event on the tractor 116. The container-operation-related event includes at least two types: a container pick up from the chassis 116 and a container drop off onto the tractor chassis 116. A processor 706 associates containers with HEs based on the information from the operation detector 702 and the information from the event detector 704. A communication link 708 on the processor 706 links the operation detector 702 and the event detector 704 with the processor for transmitting information to the processor.

In another embodiment (not shown), the processor 706 is separated into multiple local processors with each local processor located on each HE and a separately located central processor. The embodiment shown in FIG. 7 with an integrated processor will be described in detail subsequently; however, one skilled in the art can easily recognize that the description can easily be applied to have separated processors.

The operation detector 702 on a CHE 102 that is capable of lifting a container serves a function different from the event detector 704 on a tractor 116 that are capable of receiving and moving the containers. The operation detector 702 on a CHE 102 detects container pickup and drop off operations carried out by the CHE 102 while the event detector 704 on the tractor 116 detects container-operation-related events occurring to the tractor.

1.1 Operation Detection Based on Twist-Lock Sensor Indication

The operation detector 704 on a CHE 102 includes a plurality of sensor switches for providing a status of engagement indicating engagement and disengagement of mechanisms that secure a container to and release a container from the CHE 102. In one embodiment, the operation detection means includes twistlock sensors, such as twistlock contact sensors and twistlock engagement switches. The processor for the CHE 102 detects a container pickup or drop off operation based on the sequence of changes in its twistlock sensors. For example, during a container pickup operation, the twistlock sensors typically go through the following three-step sequence of changes: (1) the twistlock contact sensors change from "detached" to "contacted" (indicating the spreader bar of the CHE has securely contacted on the container), (2) the twistlock engagement switches change from "disengaged" to "engaged" (indicating the twistlock is in place and engaged (i.e., locked)), and finally (3) the twistlock contact sensors change from "contacted" back to "detached" (indicating the container has been lifted up and the spreader bar is no longer resting firmly on the container and the container is being supported by the twistlocks of the spreader bar). Similarly, when the CHE 102 sets down a container, the twistlock sensors go through a similar sequence of changes except in the second step the twistlock engagement switches change from "engaged" to "disengaged". There are situations where the CHE 102 operator may engage and disengage the twistlock several times to ensure a secure engagement or disengagement, which results in more steps.

The operation detector 702 includes the twistlock engagement sensor; by monitoring the changes in the status of the twistlock engagement switches, the processor for CHE 102 can determine the type of operation; that is, it is a pickup operation if the final status is "engaged" and a drop off operation if the final status is "disengaged". In another embodiment, the operation detector 702 comprises both the twistlock engagement switches and the twistlock contact sensor, and the time at which the twistlock contact sensors change from "contacted" to "detached" after the final change in the twistlock engagement switches is the time when the pickup or drop off operation actually occurs.

1.2 Operation Detection Based on Vibration Detector

Alternatively, the operation detector 702 can include a vibration detector similar to that in an event detection apparatus which is disclosed earlier. The vibration detector provides measurements of vibrations of CHE 102, which can be used by the processor for CHE 102 to detect an occurrence of a container operation. As will be appreciated by those skilled in the art, the operation detection based on vibrations of CHE 102 is similar to the event detection based on vibrations of a tractor.

Thus, based on the operation detector, the processor for CHE 102 detects a container pickup or drop off operation as well as the time the operation occurs. If a positioning sensor such as GPS or a transponder is available on the CHE, the processor for CHE 102 further determines the location of the operation based on the position of CHE 102 provided by the positioning sensor. The processor 706 then communicates the detection of the operation, including the type (pick up or drop off), the time, and the location, as well as the ID of the CHE to the processor 706.

2. Event Detection Based on Event Detector

The event detector on the tractor 116 (or other HEs that are capable of receiving and moving the containers) can include a vibration detector for detecting vibration patterns induced by the container-operation-related events. The processor for the tractor 116 follows the process described in FIG. 3 to detect container-operation-related events as well as the time and the type of the events. Alternatively, the event detector can include a container-position detector for detecting the presence of a container (or containers) on the chassis attached to the tractor 116 and for providing a status of presence as well as a distance between the container (or containers) and the location of this container-position detector on the tractor. The processor for the tractor detects container-operation-related events occurring to the tractor based on changes in the status of presence and the distances before and after the changes. Subsequently, the processor on the tractor communicates to the central processor 706 the event information, including the time, the event type, the location and the ID of the tractor 116.

3. Method Steps for Inventory Association Using Mutual Operation-Event Detection If an event (i.e., container-operation-related event) is detected, a container has been handed over from one HE to another. An event can also be detected if a container has been "picked up" or "dropped off" by a tractor through chassis engagement or disengagement indicating a container has been handed over from one HE to another or it has been picked up from or dropped off onto the ground or the top of another container. As a result, the association between the container and the HE changes in every operation or event. Therefore, whenever an operation is detected by a CHE or an event is detected by a tractor, the inventory tracking system needs to update the corresponding container-HE association. In one embodiment, upon receiving the detection of an operation from a CHE or the detection of an event from a tractor, the central processor 706 establishes or updates the association by following an association process shown in FIG. 8.

Figure 8:
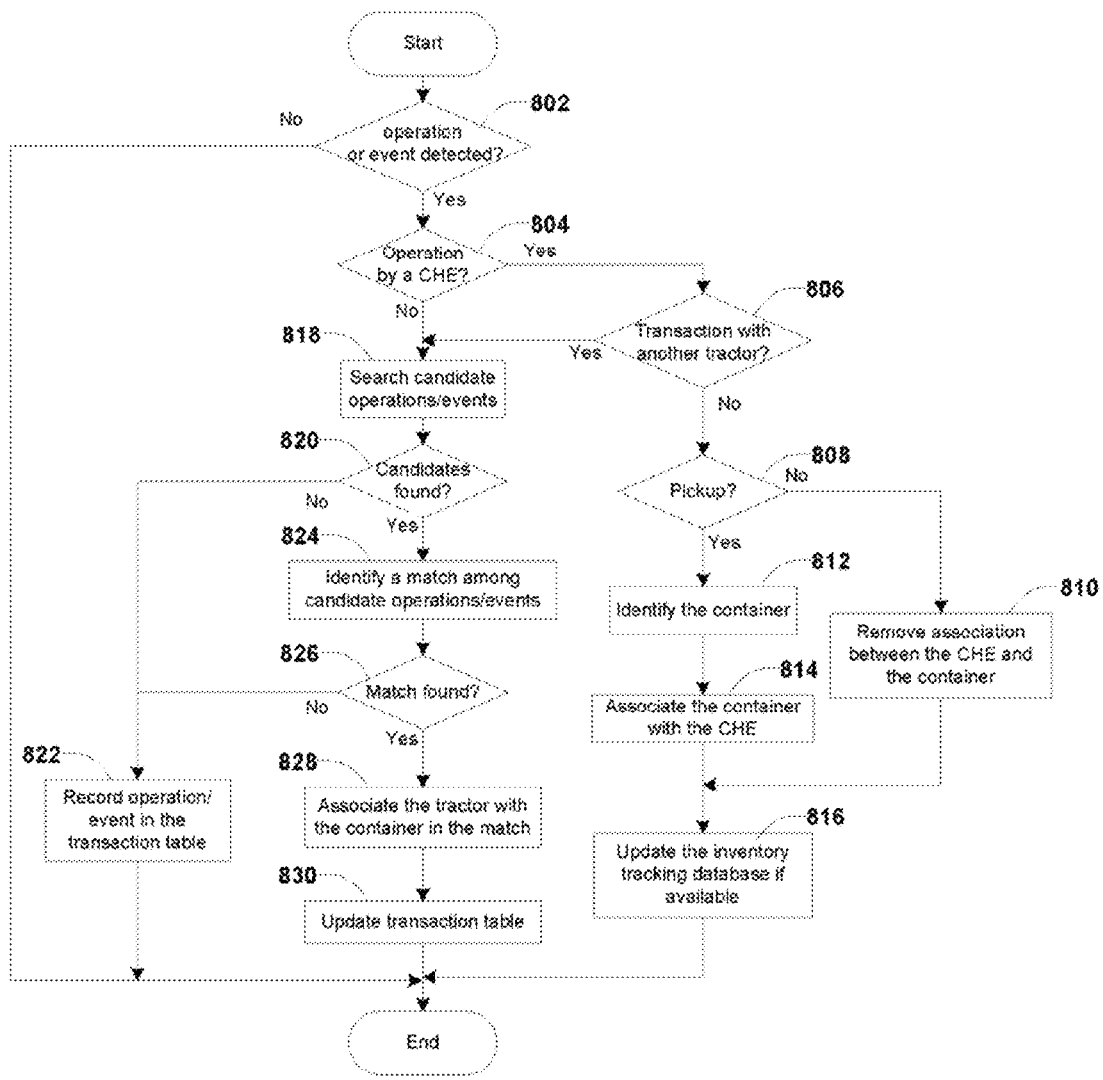
FIG. 8 is a flowchart showing the process involved in one embodiment of the inventory association system and method, in which the association of containers and HEs is based on information from an event detector.

In FIG. 8, the association process starts at step 802, where the central processor checks whether a new operation or event has been reported by a CHE or a tractor. If no new operation or event is reported, the association process ends and waits for the next processing cycle to start at step 802 again. If yes, the association process proceeds to step 804 to examine whether the reporting is an operation performed by a CHE or an event occurred to a tractor. In one embodiment, the association process makes the decision based on the equipment ID in the operation or event data; if the equipment ID is an ID of a CHE, the association process concludes it is an operation reported by a CHE and proceeds to step 806; otherwise, the association process concludes it is an event reported by a tractor and proceeds to step 818. In another embodiment, CHEs and tractors add an additional flag in their operation or event reporting, which indicates whether the reported data is an operation or an event. The association process therefore makes the decision at step 804 based on that flag.

Since a CHE only detects the occurrence of a container pickup or drop off operation, it does not distinguish whether it picks up a container from (or sets down a container onto) the ground or the chassis of a tractor. Therefore, at step 806, the association process determines whether the operation is a transaction involving another HE (i.e., tractor) or not. In one embodiment, the CHE is also equipped with a height sensor measuring the height of the container and the height measurement at the time the twistlock engagement switches change their output. For example, when a CHE picks up a container from the ground or from a container stack, the measurement of the height sensor at the time the twistlock is engaged has only one of several specific values corresponding to the height of one container (if the container is on the ground), two containers (if there is one container beneath the container being picked up), three containers (if there are two containers beneath the container being picked up), and so on. If on the other hand, the container is being pickup from the chassis of a tractor, the measurement of the height sensor when the twistlock is engaged has a value corresponding to the height of a chassis and the height of a chassis. Thus, based on the height included in the location information, an association processor can determine whether another HE (i.e., tractor) is involved in the transaction (i.e., the operation is from (or to) the chassis of a tractor). If yes, the process proceeds from step 806 to steps 818 through 830 to find the correct tractor for association; if no, the transaction does not involve a tractor and the process continues from step 806 to step 808 to determine whether the operation is a pickup or a drop off. Alternatively, if the height information is not available, the processor always assumes a tractor is involved in the operation and proceeds to step 818 through 830.

At step 808, the association process examines the type of the operation included in the operation reporting. If the operation is a container drop off, the process then removes the association between the CHE and the container at step 810. In one embodiment, the association process maintains an association table in which there is an entry for each HE that is currently operating in the shipping container yard, and each entry contains at least the ID of the HE and the ID of the container the HE is currently associated with. For example, if a CHE A has picked up container C1 and is moving it, the entry for CHE A is [A, C1, t1], where t1 is the time the association is established. When CHE A sets down Container C1 on the ground, the association process removes the association between CHE A and Container C1 by changing the entry for CHE A to [A, null, t2], where t2 is the time the association is removed. At step 816, the association process then reports the location of the container to the inventory tracking database for update.

If a container pickup operation has occurred, the association process identifies the pickup operation at step 808 (based on the reported operation type) and creates an ID for the container at step 812. The association process then associates the container with the CHE at step 814. In one embodiment, this is achieved by changing the entry corresponding to the CHE to [CHE ID, container ID, current time] in the association table. If the inventory association system further interfaces with an inventory tracking system, the processor can inquire the inventory tracking system with the ID of the CHE and the time of occurrence of the operation for the location of the CHE (as the location of the operation) as well as the ID of the container at the location. Then at step 816, the association process updates the inventory tracking database to show the container has been picked up by the CHE and to remove or expire the data record that shows the container at its previous specified location.

In the embodiment shown in FIG. 8, the event type does not include chassis engagement and disengagement; therefore, an event will always involves a CHE and a tractor. Thus, if an event has been reported (as determined at step 804), the association process continues to steps 818 through 830 for association. Similarly if the operation in step 806 does involve a tractor the process continues with steps 818 through 830. The following description assumes an event has been reported; however, the processing for cases where the reported operation involves a tractor is similar. As described before, an event is essentially an operation from the tractor's view point. In one embodiment, the tractor detects six types of events, which have been described earlier with respect to FIG. 2. For the completeness of the description, these six types are repeated here as follows: (1) a container drop off in the middle of the chassis (FIG. 4A), (2) a (short) container drop off at the front of the chassis (FIG. 4B), (3) a (short) container drop off at the rear of the chassis (FIG. 4C), (4) a container pick up in the middle of the chassis, (5) a (short) container pick up at the front of the chassis, and (6) a (short) container pick up at the rear of the chassis.

Since events are caused by operations, the association process searches a transaction table for candidate operations at step 818 when the new event is reported. The transaction table is created and maintained by the association process to keep a record of all the container transactions between HEs. Each entry in the transaction table contains at least the following information: the ID of the HE that provides the container, the ID of the container, the ID of the HE that receives the container, and the time the transaction occurs. For example, when a top pick (a type of CHE) picks up a container from a tractor, a complete entry for this transaction table should include the ID of the tractor as the provider of the container, the ID of the container, the ID of the top pick as the receiver of the container, and the time this pick up operation occurs. In order to establish such a complete entry, the association process needs to go through steps 818 through 830.

Initially in step 818 a search is made to determine if the operation or event has been reported. When two HEs are involved, due to the delays in the detectors and the processors on the CHE and the tractor, as well as communication delays, the central processor most likely receives an operation report and an event report at different time instants, and therefore they are processed one by one in different processing cycles. The association process then searches the transaction table in step 818 for candidate operations to determine if the event or operation has already been reported. The search can be based on the event type, the time, and the location of the event.

In one example, a search is made in step 818 to find unmatched container pickup operations (when the event indicates a pickup operation) occurred within a pre-set time window ([t_event−T1, t_event+T2]), where t_event is the time of the event and T1 and T2 are pre-determined thresholds. In another example, the search is made in step 818 to find unmatched container pickup operations whose locations are within a pre-determined distance to the location of the reported event. In yet another example, the search is made in step 818 to find unmatched container pickup operations satisfying both the time window and the location proximity requirements. If no candidates are found, the association process in step 820 determines that the corresponding operation has not been reported and the process simply creates a new transaction entry in the transaction table at step 822 to store the event information. Since this newly created transaction entry only contains the ID of the tractor that provides the container and the ID of the container, this entry is not a complete entry and the process marks the entry as "unmatched." Furthermore, the association process updates its association table in step 822 to remove the association between the container and the tractor.

If candidates are found at step 818, the association process in step 820 then identifies a match among the candidates at step 824. In one embodiment, the association process evaluates each candidate based on factors including the time gap between the operation and the event, the proximity between the operation location and the event location, the size of the container, and so on. The association process then calculates the likelihood of a match for each of the candidates based on the above factors. For example, if the size of the container in a candidate pickup operation is 40 ft while the size of the container in the event is 20 ft (a short container), the corresponding likelihood value will be reduced. Also in this embodiment, if the highest likelihood value is greater than a pre-determined threshold, the corresponding candidate is determined as a match; otherwise, the association process concludes that no match has been found.

A match will be located in step 824 after it is processed previously at step 822 in previous processing cycles; that is, the matching operation has been reported earlier. Referring back to the container pickup example, since the event reporting is considered before the operation reporting, the association process will not be able to find a match for the reported event in step 824. The process will then be directed to step 822 via step 826 to create a transaction record for the event and marks the transaction as "unmatched". The process then exits and waits for the next processing cycle to start at step 802. Assuming, after a few processing cycles, the operation reporting corresponding to the aforementioned event reporting arrives and the association process goes to step 818 through steps 802, 804, and 806. At step 818, the candidate events will then include the aforementioned event, which will then be determined as a match at step 824. Subsequently, the association process will associate the container with the CHE at step 828; in one embodiment, this is achieved by adding the container ID to the entry corresponding to the CHE in the association table. At step 830, the association process then further adds to the corresponding transaction entry the ID of the CHE as the HE that receives the container and marks the transaction as "matched" (or "complete").

Figure 9A:
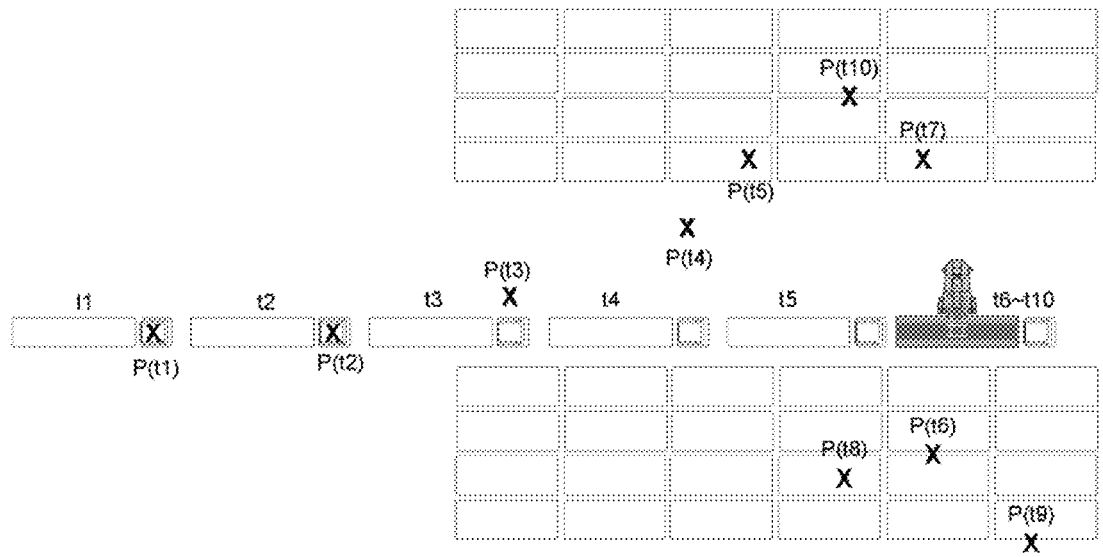
FIGS. 9A and 9B show that errors in position estimates could cause problems for associating containers with HEs.
Figure 9B:
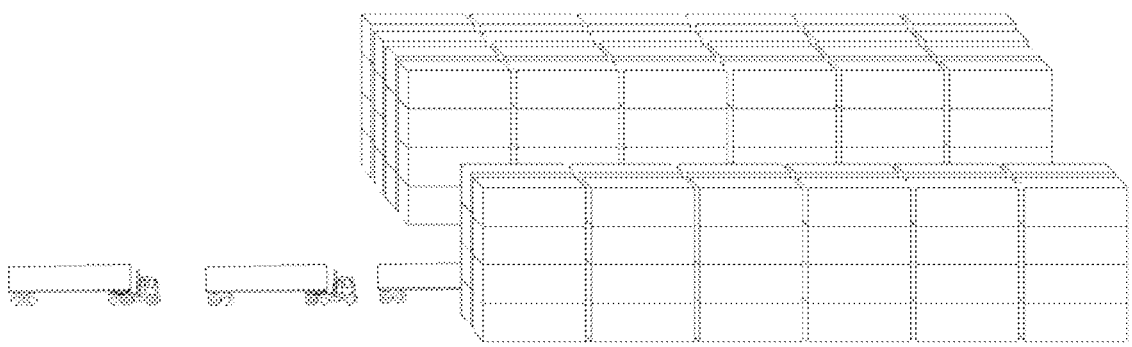

D. Inventory Association Based on Position Sensor and Motion Sensor for Determining Distance To Last Trustworthy Position FIGS. 9A and 9B illustrate an example where errors in position estimates could cause problems for transaction associations. As mentioned earlier in the background herein, inventory association based on position estimates can suffer from errors in position estimates. However, by incorporating information related to tractors' motion, accurate transaction association can be achieved based on position estimates without equipping tractors with detectors such as vibration detectors or container position detector as described earlier herein. In regards to FIGS. 9A and 9B, assume the position sensor on each HE is a DGPS. It is also reasonable to assume the DGPS on a CHE is of higher accuracy and therefore more expensive than the DGPS on a tractor since the number of CHEs in a container storage facility can be much less than the number of tractors.

FIG. 9A shows a case where a tractor first approaches a top pick during time t1 to time t5, arrives at the operation location at time t6, and stops during time t6 through time t10 to receive a container at time t8. The actual location of the tractor at time t1 through time t10 is denoted by the top view of the tractor with its attached chassis in FIG. 9A and the side view in FIG. 9B, while the position measurements from the DGPS, P(t), are denoted by "X". As described in the background herein, the operation location is typically surrounded by containers stacked several tiers high forming makeshift canyons. Such a canyon-like working environment causes (long periods of) GPS blockage as well as multipath that can induce relatively large errors in GPS positions (shown as an "X" not directly associated with the tractor from time t3 to t10). Both tractors and CHEs can report their positions (either GPS positions or GPS-based positions) to a central processor through their onboard communication units, and the central processor then tries to identify the pair of CHE and tractor that is involved in a transaction based on the reported positions. Due to the potentially large errors in the positions (at least in the positions of the tractor), the central processor may fail to make the association. Furthermore, if there is another tractor in the region, whose GPS positions are actually closer to the GPS position of the top pick due to position errors, the central processor will likely make a wrong association by recognizing this other tractor as the one that received the container.

In FIGS. 9A-9B, GPS-based positioning system is assumed to provide position estimates; however, as most positioning systems are based on proximity or triangulation, they suffer similar issues and the resultant errors have similar effects on inventory associations. For example, a real-time locating system (RTLS) is essentially a reverse GPS system and the canyon-like environment creates blockage and multipath problems for it as well. More specifically, in a RTLS, a mobile positioning unit on a HE transmits radio waves to at least three nearby fixed local receivers, each of which determines the travel time of the radio waves and transmits the travel time to a central processor. The central processor then determines the position of the HE based on the radio waves' travel time to those fixed local receivers. The canyon-like environment between stacks of containers can block or reflect the signal the HE tries to communicate to the fixed local receivers, resulting in no solutions (i.e., blockage) or erroneous solutions by the central processor.

To ensure correct association of containers and HEs using position estimates from positioning systems, some embodiments of the present invention provide an association determined by incorporating a distance from the last trustworthy position (or positions) of the tractor. This distance is referred to as the distance-to-last-trustworthy-position and is calculated based on information related to the motion of the tractor.

Figure 10:
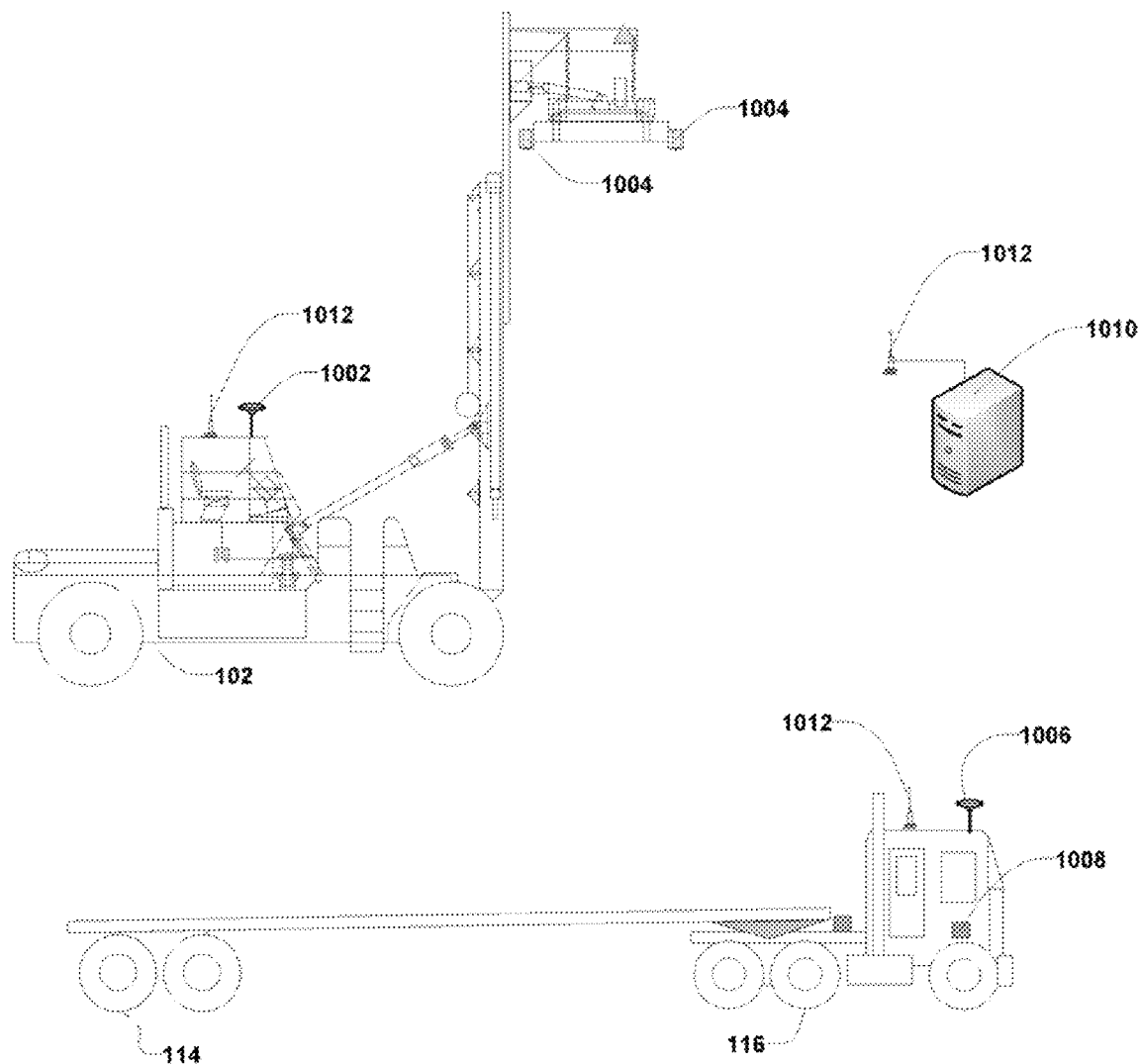
FIG. 10 shows another embodiment of the inventory association system and method, in which the association of containers and HEs is determined by incorporating the distance of a tractor from its last trustworthy position (or positions). This distance is referred to as the distance-to-last-trustworthy-position herein.

FIG. 10 illustrates components of a container tracking system that uses GPS sensors for position determination in an inventory association system. The system of FIG. 10 includes a first mobile unit that can include a first positioning unit (GPS sensor) 1002 and an operation detector 1004 on a CHE 102, a second mobile unit that can include a second positioning unit (GPS sensor) 1006 and a motion detector 1008 on a tractor 116, a processor 1010 for associating containers with (HEs), and a communication link 1012 between the first and second mobile units and the processor to enable information exchange.

The first positioning unit GPS sensors 1002 provides first positions of the CHE 102 and the operation detector 1004 provides information indicating an occurrence of a container operation, such as a pick up or drop off of a container conducted by the CHE 102. The second positioning unit 1006 provides second positions of the tractor 116 as well as confidence levels of the positions and a motion detector 1008 provides information pertaining to motion of the tractor 116.

The GPS or similar position sensor 1002 and 1006 on each HE provides the position of the HE. The position sensor 1002 or 1006 can include at least one of the following: GPS (Global Positioning System) or a DGPS (Differential GPS), INS (Inertial Navigation System), IMU (Inertial Measurement Unit), RTLS (Real Time Locating System), PDS (Position Detection System), and any other sensors and systems that can be used to determine the location of HEs.

The motion detector 1008 on the tractor 116 can include at least one of the following: a speed sensor that directly measures the speed of the tractor, an accelerometer for measuring the longitudinal acceleration of the tractor, which is used to calculate the speed of the tractor, a yaw rate sensor, a yaw acceleration sensor, and a compass for providing the heading angle of the tractor 116.

The central processor 1010 detects an occurrence of a container operation (including container pick up and drop off) from the operation detector 1004 as well as relevant position information from the first position sensor 1002. The processor 1010 further determines whether the tractor 116 is involved in the container operation based on a plurality of the following: the location of operation, the motion of the tractor 116 before and at the time of occurrence, the operation type, and the second positions. If the tractor 116 is determined to be involved in the container operation, the processor 1010 further associates the container with the CHE 102 if the operation is a pick up or with the tractor 116 if the operation is a drop off.

In one embodiment, the processor 1010 includes multiple local processors distributed on each HE 102 and 116 and a central processor provided at the original location of the main processor 1010. However, as one skilled in the art can easily recognize, the processor can be provided as an integrated centralized device as shown in FIG. 10.

To describe how the distance-to-last-trustworthy-position is used in the association between containers and HEs, assume the same case shown in FIGS. 9A and 9B and assume the tractor is equipped with a motion detector such as a speed sensor. As the GPS positions begin to deteriorate when the tractor enters the alley at time t3, the corresponding confidence level decreases accordingly. Since the confidence level at time t8 when the container drop off operation occurs is low, the processor onboard the tractor retrieves the last trustworthy position, i.e., the last position that has a high confidence level, which would be P(t2) in this example. Based on the time of the last trustworthy position (i.e., t2), the tractor's onboard processor then computes the tractor's distance to the last trustworthy position (i.e., the distance-to-last-trustworthy-position based on the speed collected from time t2 to the time the operation occurs at t8). In this specific case, since this distance-to-last-trustworthy-position is based on speed only (i.e., assuming the tractor was travelling straight), it is equivalent to the tractor's travel distance from time t2 through time t8. Since the speed information is almost immune to the canyon-like working environment and tractors mostly travel straight in the alleys between container stacks, the tractor's calculated travel distance should approximate the distance between the operation location and the last trustworthy position. Therefore, the central processor can identify the actual tractor that is involved in a container operation and associate it with the container it receives.

Figure 11:
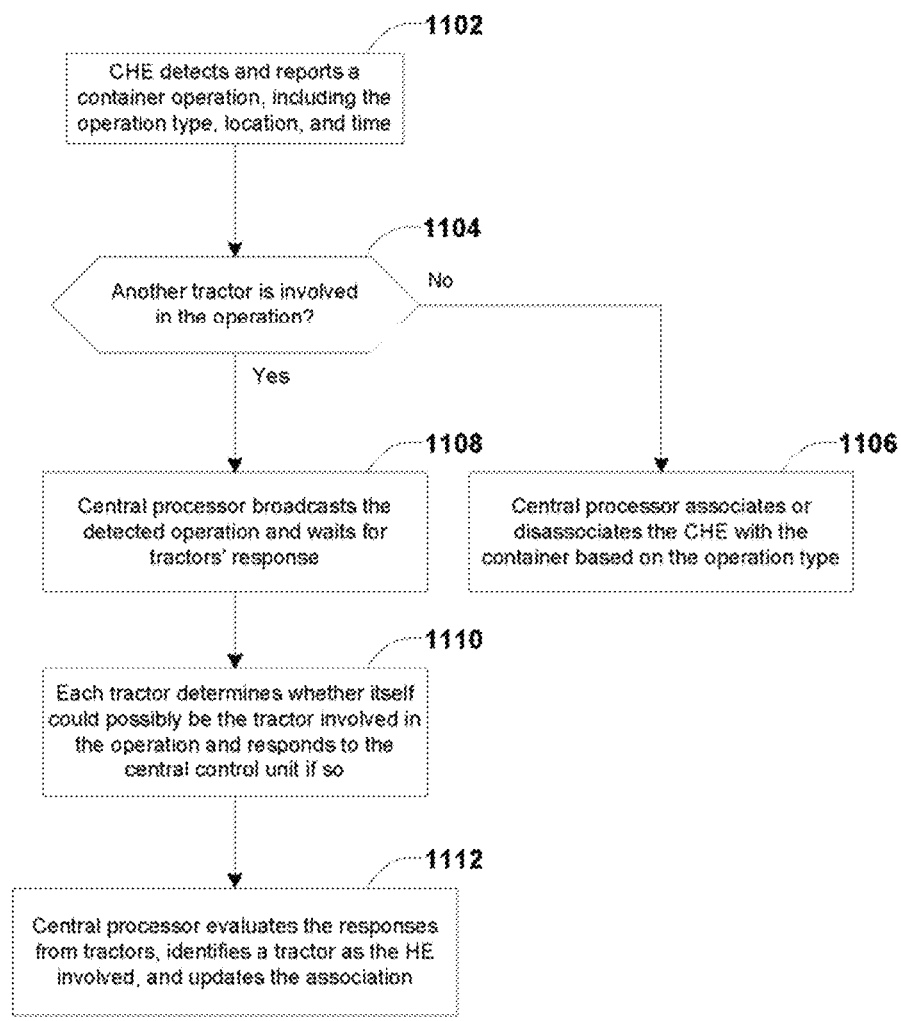
FIG. 11 is a high-level block diagram showing a process for associating containers with HEs by incorporating the distance-to-last-trustworthy-position.

1. Method Steps for Inventory Association Using Position Sensor and Motion Sensor for Determining Distance to Last Trustworthy Position FIG. 11 is a high-level block diagram showing one embodiment of a process for associating containers with HEs in an inventory association system that uses positioning units. Reference can be made to FIG. 9 to illustrate HE positioning during the steps of FIG. 11. Starting at step 1102, the processor for a CHE monitors the output of its operation detector, which can be twistlock sensors, and detects the occurrence of a container pickup or drop off operation. Upon detection of a container pickup or drop off operation, the processor for the CHE reports the operation to a central processor via the onboard communication unit. The reported information includes the operation type (pickup or drop off), the CHE's location at the time of the operation (including height if available), and the time the operation occurred. The reported information may further include the size of the container as determined by the length of the spreader bar.

At step 1104, upon receiving a reported container operation from a CHE, the central processor determines whether a tractor is involved. The determination of whether a tractor is involved can be based on a sensor indication such as one indicating height of the container. For instance, if the height corresponds to the height of one or several containers, the CHE is operating on containers on the ground or stacked on top of other containers. If the height corresponds to the height of a chassis, the operation is with another HE. If the height is not available, the central processor always assumes a tractor is involved at step 1104 unless no matching tractor can be found (as determined in later steps).

If it is determined that the operation involves no tractor in step 1104, the central processor proceeds to step 1106 to associate the CHE with the container if the operation is a pickup operation or to disassociate the CHE with the container if the operation is a drop off operation. In one embodiment, the central processor maintains an association table to keep track of the association between containers and HEs, as described previously with respect to steps 810, 814, and 828 in FIG. 8. Also at step 1106, the central processor updates the inventory tracking database to reflect the change of the container location.

If the operation involves a tractor, the central processor proceeds from step 1104 to step 1108 to (1) add the operation to a transaction table and mark the corresponding entry (e.g., as "unmatched") to indicate that the tractor involved is yet to be matched to the operation, and (2) broadcast the operation information, including the type, the location, and the time of the operation as well as the size of the container to all HEs or to HEs nearby by limiting the communication transmit power. Alternatively, the central processor may identify tractors whose positions are within a pre-determined distance from the operation location and communicates the operation information to those tractors only. The pre-determined distance should be relatively large to avoid excluding the correct tractor that may be involved in the operation due to position errors.

Next at step 1110, upon receiving the operation information from the central processor, each tractor determines whether it could be the tractor involved in the operation. In one embodiment, the tractor goes through the following steps in making the determination:

Step 1: the tractor examines whether it was at or near zero speed at the time of the operation based on the speed stored in its storage unit. If it was not at or near zero speed, the tractor discards the operation information it received without responding to the central processor since a tractor can only be involved in a container operation when it is fully or almost stopped. If the speed was indeed at or near zero, the tractor then proceeds to step 2.

Step 2: the tractor next examines whether the operation is appropriate by comparing the operation with its own loading status. (This loading status is provided by the central processor whenever the tractor is associated with a container.) For example, if the tractor already has a container on its attached chassis, it cannot receive another 40 ft or 45 ft container; hence, if the operation indicates the CHE just set down a 40 ft container, then the tractor cannot be the HE involved. If the operation is in conflict with the tractor's own loading status, the tractor discards the operation information without responding to the central processor; otherwise, the tractor proceeds to step 3.

Step 3: the tractor next searches the positions stored in its storage unit for the last trustworthy position (P(t_trustworthy)) based on the confidence level and retrieves the speed between the time corresponding to the last trustworthy position (t_trustworthy) and the operation time (t_operation). The tractor then calculates the distance-to-trustworthy-position based on the motion information. The distance-to-trustworthy-position (S_motion) can be determined based on a speed sensor or an accelerometer for proving the speed of the tractor, e.g., as the tractor's travel distance using the speed between t_trustworthy and t_operation:

$$S_{motion} = \int_{t\_trustworthy}^{t\_operation} speed \times dt$$

The tractor also calculates the distance between the operation location and the last trustworthy position: S_distance=P_operation−P(t_trustworthy). The tractor further determines the difference between the two distances: S_gap=S_motion−S_distance as the gap between the tractor and the CHE that performs the operation at the time of the operation. The tractor then responds to the central processor by communicating the operation information together with its ID and S_gap.

At step 1112, upon receiving responses within a pre-set time period after the operation information was first broadcasted (at step 1108), the central processor then evaluates the responses from tractors to identify the tractor involved in the operation. In one embodiment, the evaluation is simply based on the gap (S_gap) between each tractor and the CHE, and the tractor that has the smallest gap is chosen as the tractor involved in the operation. The central processor then adds the ID of the tractor to the entry of the operation and marks it (e.g., as "matched") to indicate that all parties involved in the operation are identified. If the operation is a container pickup operation, the central processor further removes the association between the container and the tractor and associates the container with the CHE; if the operation is a container drop off operation, the central processor removes the association between the container and the CHE and associates it with the tractor. The central communication unit may further communicate the association information back to the tractor for the tractor to keep track of its own loading status.

2. Inventory Association Using Position Sensor and Motion Sensor—Determining Distance to Last Trustworthy Position with Motion Not in a Straight Line In another embodiment, the motion detector on the tractor includes a speed sensor (or an accelerometer) for providing the speed of the tractor and an angular-motion detector for providing the angular motion of the tractor on the ground. The angular-motion detector can include a yaw rate sensor, a yaw acceleration sensor, and a sensor or device (such as a compass) for providing the heading angle of the tractor. Thus, instead of assuming the tractor travels straight, the position of the tractor at the time the operation occurred, Pe(t_operation), is determined by feeding the last trustworthy position (e.g., P(t2)), the tractor's speed, and the tractor's yaw rate or heading angle into a kinematic or dynamic model of the tractor. Subsequently, the tractor computes the distance-to-last-trustworthy-position as the distance between Pe(t_operation) and the last trustworthy position and communicates the distance-to-last-trustworthy-position to the central processor. Alternatively, the tractor can respond to the central processor directly with the calculated position Pe(t_operation) together with the operation information and the ID of the tractor for the central processor to make the final decision of which tractor is the HE involved in the operation.

The process shown in FIG. 11 has the central processor broadcast or communicate the operation reported by a CHE. Alternatively, in another embodiment of the system, a CHE directly broadcasts the operation information if it determines that a tractor is involved. The broadcasting may be set to have limited power to limit the area the broadcast can cover since only tractors nearby need to receive and process the operation information. The tractors can still send responses to the central processor for it to make the final decision of which tractor is the one involved in the operation.

Figure 12:
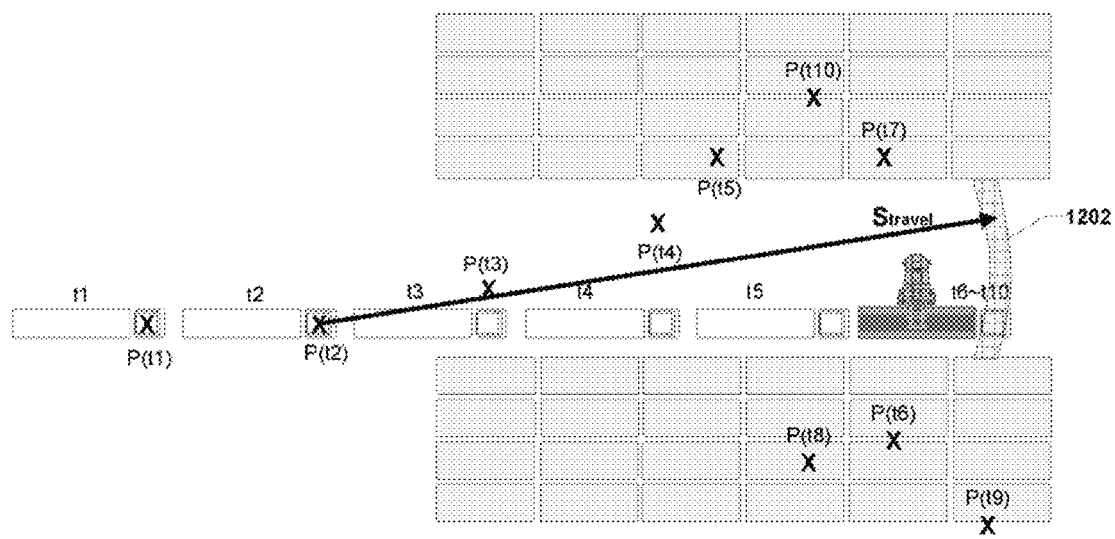
FIG. 12 illustrates the likely positions of a tractor at the time of occurrence of a container operation according to another embodiment of the inventory association system, which incorporates both the distance-to-last-trustworthy-position and the profile of a container shipping yard in associating containers with HEs.

FIG. 12 modifies FIG. 9 to illustrate how a tractor heading angle and a map or profile of the container yard can be used to better identify a tractor involved with a CHE in a container handling operation. With the tractor equipped with a map showing the profile of the container yard, based on the last trustworthy position and information such as the heading angle of the tractor, the distance-to-last-trustworthy-position the tractor can further determine its likely position at the time the operation occurs. FIG. 12 illustrates the likely positions as a ring-shaped area 1202 with its center line as a portion of a circle, whose center is at the last trustworthy position (P(t2)) and whose radius is the tractor's distance-to-last-trustworthy-position (S_motion). The width of the area depends on the confidence level of the trustworthy position (P(t2)) and the noise level in the speed signal. The higher the confidence level of the trustworthy position and the smaller the noise, the narrower the area.

E. Detailed Integrated Association System Using Position, Motion, and Event Detection In further embodiments, in addition to the positioning means and the motion detector for providing the motion of the tractor, the tractor can also be equipped with an event detector for providing information indicating an occurrence of a container-operation-related event occurring to the tractor. The event detector can include a speed detector 202 and a vibration-detection means 204 as described with respect to FIG. 2. Alternatively, the event detector may include a container-position detector such as radar, LIDAR, and cameras described with respect to FIG. 6 that detects the presence of at least one container on the chassis. The processor onboard the tractor then further detects the occurrence of container-operation-related events and incorporates the event detection in the association. In one non-limiting embodiment, at step 110 of FIG. 11, the tractor also examines whether a container-operation-related event has been detected within a pre-defined time window of the time of occurrence for the operation. If so, the tractor responds to the central processor with its ID and $S_{gap}$; otherwise, the tractor does not respond to the central processor.

In addition, the central processor can further incorporate in its evaluation of responses from tractors factors such as the turn-around time for tractors and sequencing of tractors. For example, the tractors in a container yard take turns to cooperate with CHEs in container operations repeatedly. Therefore, the time gap between recent events for a tractor will be approximately the same. Thus, the central processor can assess the likelihood of a tractor in an operation by comparing the time gap between the operation and the previous event of the tractor with the time gaps between recent events of the tractor. Similarly, if the central processor receives responses from multiple tractors, the central processor can evaluate the responses with the sequence of the last events of these tractors. For example, if tractor A had a container drop off event before tractor B at the same location and then had a container pickup event before tractor B at another same location, it is likely tractor A will have the next container drop off event before tractor B. The central processor may also monitor the sequence in which tractors enter an alley based on their (trustworthy) positions and incorporate the sequence in the evaluation of responses. For example, if tractor A enters an alley before tractor B, tractor A is more likely to have an event occurring in the alley before tractor B since tractors typically line up to wait for their turn to work with CHEs.

Although the present invention has been described above with particularity, this was merely to teach one of ordinary skill in the art how to make and use the invention. Many additional modifications will fall within the scope of the invention, as that scope is defined by the following claims.

What is claimed:

1. An event detection apparatus adapted for use with a handling equipment that can have a chassis attached to it for receiving and transporting a container, comprising:
    a vibration detector to measure vibrations of the handling equipment; and
    a processor, connected to the vibration detector to receive measurements from the vibration detector, to detect vibrations by examining characteristics of the measurements from the vibration detector, to determine whether the handing equipment is at near-zero speed including zero speed, and to determine container-operation-related events occurring to the handling equipment by analyzing patterns of the vibrations detected when the handling equipment is determined to be at near-zero speed.

2. The event detection apparatus of claim 1, wherein the container-operation-related events comprise: pick up of the container from the chassis attached to the handling equipment and drop off of the container onto the chassis of the handling equipment.

3. The event detection apparatus of claim 1, wherein the container-operation-related events comprise at least one of the following eight types of events: (1) drop off of the container in a middle of the chassis attached to the handling equipment, (2) drop off of the container at a front of the chassis, (3) drop off of the container at a rear of the chassis, (4) pick up of the container in the middle of the chassis, (5) pick up of the container at the front of the chassis, (6) pick up of the container at the rear of the chassis, (7) engagement of the chassis with the handling equipment, and (8) disengagement of the chassis from the handling equipment.

4. The event detection apparatus in claim 1, wherein the vibration detector comprises at least one of the following: a sound detector that detects sounds caused by the impact of a container with the chassis during the container-operation-related event; an accelerometer that detects a vertical motion of the handling equipment; a height sensor that detects a vertical motion of the handling equipment by measuring a height from the height sensor to the ground; and an angular motion sensor that detects a pitch motion of the handling equipment.

5. The event detection apparatus in claim 1, wherein the processor determines whether a container-operation-related event has occurred as well as an event type by analyzing the detected vibrations using techniques comprising at least one of pattern recognition, model matching, information-based algorithm, cognitive-based algorithm, and rule based logics.

6. The event detection apparatus in claim 1, wherein the vibration detector comprises an angular motion sensor that allows determination of a pitch angle of the handling equipment and the processor further incorporates a change in the pitch angle of the handling equipment before and after vibrations occur to detect container-operation-related events.

7. The event detection apparatus in claim 1, further comprising a speed detector to provide information pertaining to whether the handling equipment is at near zero speed including zero speed,
    wherein the speed detector comprises at least one of the following: a sensor for providing a speed of the handling equipment, a sensor for providing an acceleration of the handling equipment, and a sensor for providing a gear position of a transmission of the handling equipment, and wherein the processor detects the container-operation-related events when the speed detector indicates the handling equipment is at near zero speed including zero speed.

8. The event detection apparatus in claim 1,
further comprising a container-presence detector to provide a status indicating a presence of the container on the chassis,
wherein the processor further incorporates the status from the container-presence detector in detecting container-operation-related events and in determining an event type for each of the container-operation-related events.

9. The event detection apparatus in claim 1, wherein the processor detects vibrations by identifying a start of a vibration when the measurements from the vibration detector are larger than predetermined thresholds and identifying an end of the vibration when the measurements are smaller than predetermined thresholds for a predetermined time duration.

10. The event detection apparatus in claim 1, wherein the processor determines whether the handing equipment is at near-zero speed including zero speed by analyzing characteristics of the measurements from the vibration detector.

11. An inventory association system for associating containers with handling equipment for handling containers in a container storage facility with a plurality of container handling equipment, comprising
an operation detector, each installed on a unit of first handling equipment, each first handling equipment unit configured to lift and transport a container, each operation detector providing information indicating an occurrence of container operations conducted by a respective unit of the first handling equipment, wherein the container operations comprise: a container pickup operation and a container drop off operation;
an event detector, each installed on a unit of second handling equipment, each second handling equipment unit having a chassis attached to it for transporting a container, each event detector providing information indicating an occurrence of container-operation-related events occurring to a respective unit of the second handing equipment, wherein the container-operation-related events comprise: pick up of a container from the chassis and drop off of a container onto the chassis;
a processor for matching a container operation conducted by a respective unit of the first handling equipment with a container-operation-related event occurring with a respective unit of the second handling equipment and associating the container in each of the container operations with a single unit of the handling equipment among the respective two units of first and second handling equipment based on the information from the operation detectors and the event detectors; and
a communication link between the operation detectors and the processor as well as between the event detectors and the processor.

12. The inventory association system in claim 11, wherein each of the operation detectors comprises a plurality of sensor switches for providing a status of engagement indicating engagement and disengagement of mechanisms that secure a container to and release a container from the respective unit of the first handling equipment, and
the processor detects an occurrence of a container operation and a time of occurrence based on changes in the status of engagement.

13. The inventory association system in claim 11, wherein each of the operation detectors comprises a vibration detector for measuring vibrations of the respective unit of the first handling equipment, and
the processor detects vibrations of the first handling equipment caused by impact due to container operations based on the measurements from the vibration detector and determines an occurrence of a container operation and time of occurrence based on patterns of the detected vibrations.

14. The inventory association system of claim 11, wherein each of the event detectors comprise a container-position detector that provides a status of presence of at least one container on a chassis attached to the respective unit of the second handling equipment as well as a distance between the container and the respective unit of the second handling equipment, and
the processor detects an occurrence of a container-operation-related event and a time of occurrence based on changes in the status of presence as well as the distances before and after the changes.

15. The inventory association system in claim 11, wherein each of the event detectors comprises a vibration detector to provide vibration measurements of the respective unit of the second handling equipment, and wherein the processor detects vibrations of the second handling equipment caused by impact due to container operations based on the measurements from the vibration detector and determines an occurrence of a container-operation-related event and time of occurrence based on the detected vibrations.

16. The inventory association system in claim 15, wherein the vibration detector comprises at least one of the following:
a sound detector that detects sounds caused by the impact of a container with the chassis during the container-operation-related event;
an accelerometer that detects a vertical motion of the handling equipment;
a height sensor that detects a vertical motion of the handling equipment by measuring a height from the height sensor to the ground; and
an angular motion sensor that detects a pitch motion of the handling equipment.

17. The inventory association system in claim 11, wherein the processor matches a container operation with a container-operation-related event and associates the containers with handling equipment by
detecting a given one of the container operations and a time of occurrence based on the information from one of the operation detectors on the first handling equipment,
detecting a given one of the container-operation-related events and a time of occurrence based on the information from one of the event detector on the second handling equipment,
determining whether the given container-operation-event matches the given container operation by comparing the time of occurrence for the given event with the time of occurrence for the given operation, and
if the given container-operation-event matches the given container operation, associating a the container involved in the given container operation with one of the respective units of the first and second handling equipment based on at least one of the two types: the type of the given operation and the type of the given event.

18. The inventory association system in claim 17, wherein the processor further
   determines an operation type for the given container operation and an event type for the given container-operation-related event, and
   compares the event type for the given event with the operation type for the given operation in determining whether the given container-operation-event matches the given container operation.

19. The inventory association system in claim 11, wherein the processor comprises:
   first distributed processors, each provided on one unit of the first handling equipment for detecting a container operation and a time of occurrence based on the information from the operation detector on the respective unit of the first handling equipment,
   second distributed processors, each provided on one unit of the second handling equipment for detecting a container-operation-related event and a time of occurrence based on the information from the event detector on the respective unit of the second handling equipment, and
   a central processor for associating containers with individual units of the first and the second handling equipment based on the detections from the first and the second distributed processors.

20. The inventory association system in claim 11, wherein the container-operation-related events include a plurality of types comprising: (1) drop off of the container in a middle of the chassis attached to the handling equipment, (2) drop off of the container at a front of the chassis, (3) drop off of the container at a rear of the chassis, (4) pick up of the container in the middle of the chassis, (5) pick up of the container at the front of the chassis, (6) pick up of the container at the rear of the chassis, (7) engagement of the chassis with the handling equipment, and (8) disengagement of the chassis from the handling equipment, and
   upon detecting a given one of the container-operation-related events, the processor further determines the type of the given container-operation-related event based on information from the respective event detector.

21. The inventory association system in claim 11, further comprising
   a first positioning unit installed on each unit of the first handling equipment for providing first positions of the respective unit of the first handing equipment, and
   a second positioning unit installed on each unit of the second handling equipment for providing second positions of the respective unit of the second handing equipment,
   wherein the communication link further links the first and the second positioning units to the processor and the processor incorporates the first and the second positions in the association.

22. An inventory association system for associating containers with handling equipment in a container storage facility, comprising:
   a first mobile unit, each installed on a unit of first handling equipment that can lift and transport a container, comprising
      a first positioning unit to provide first positions of a respective unit of the first handing equipment, and
      an operation detector to provide information indicating an occurrence of a container operation conducted by the respective unit of the first handling equipment, wherein the container operation includes at least two types: a container pickup operation and a container drop off operation;
   a second mobile unit, each installed on a unit of second handling equipment that has an attached chassis for receiving and transporting a container, comprising
      a second positioning unit to provide second positions of a respective unit of the second handing equipment,
      a motion detector to provide information pertaining to motion of the respective unit of the second handling equipment in the container storage facility;
   a processor for detecting the occurrence of a container operation conducted by a unit of the first handling equipment, identifying a unit of the second handling equipment that is involved in the detected container operation and associating the containers in the said container operation with one of the two respective units of handling equipments based on the first positions, the information from the operation detectors, the second positions, and the information from the motion detectors; and
   a communication link between the first mobile units and the processor as well as between the second mobile units and the processor configured to transmit information from the first and the second mobile units to the processor.

23. The inventory association system in claim 22, wherein each of the operation detectors comprises a plurality of sensor switches for providing a status of engagement indicating engagement and disengagement of mechanisms that secure a container to and release a container from the respective unit of the first handling equipment.

24. The inventory association system in claim 22, wherein the processor detects the occurrence of the container operation, identifies the unit of the second handling equipment that is involved in the detected container operation and associates the container with handling equipment by
   detecting a given one of the container operations as well as a respective operation type and a time of occurrence based on the information from one of the operation detectors, and determining a location of operation based on the first positions of the respective unit of the first handling equipment,
   identifying units of the second handling equipment that are close to the location of the said operation and, for each unit, determining whether the unit of the second handling equipment is involved in the given container operation based on a plurality of the following: the location of operation, the operation type, the motion of the respective unit of second handling equipment before and at the time of occurrence, and the respective second positions, and
   if the unit of the second handling equipment is determined to be involved in the given container operation, associating a container involved in the given container operation with one of the respective units of the first and second handling equipment based on the type of the given container operation.

25. The inventory association system in claim 24, wherein the processor, in determining whether the unit of the second handling equipment is involved in the container operation, further identifies a last trustworthy position among the respective second positions collected before and at the time of occurrence based on confidence levels of the respective second positions, calculates a distance-to-last-trustworthy-position based on the motion information collected between a time corresponding to the last trustworthy position and the time of occurrence, and compares the distance-to-last-trustworthy-position with the distance between the last trustworthy position and the location of operation to determine how close the unit of the second handling equipment was to the location of operation at the time of occurrence.

26. The inventory association system in claim 22, wherein
the processor communicates the detection of a given one of the container operations as well as a respective operation type and a time of occurrence to the second mobile units,
each of the second mobile units further comprises a processor unit for determining a likelihood that the respective second handling equipment is involved in the given container operation, and each of the second mobile units communicates the likelihood to the processor, and
the processor associates containers with handling equipments based on the likelihood communicated from the second mobile units.

27. The inventory association system in claim 22, wherein
each of the first mobile units further comprises a first processor unit configured to detect a given one of the container operations as well as a respective operation type and a time of occurrence based on the information from the respective operation detectors, and determine a location of operation based on the first positions of the respective unit of the first handling equipment,
the first mobile unit communicates the detection of the given container operation as well as its operation type and time of occurrence to the second mobile units,
each of the second mobile units further comprises a second processor unit configured to determine a likelihood that the respective unit of the second handling equipment is involved in the given container operation, and
the processor associates containers with handling equipment based on the likelihood communicated from the second mobile units.

28. The inventory association system in claim 22, wherein
each of the second mobile units further comprises an event detector to provide information indicating an occurrence of a given one of container-operation-related events occurring to the respective unit of the second handing equipment, wherein the container-operation-related event includes at least two types: a container pick up from the chassis and a container drop off onto the chassis, and
the processor further detects the given container-operation-related event as well as a respective event type and a time of occurrence for associating containers with handling equipment.

29. The inventory association system in claim 22, wherein the processor further incorporates a profile of the container storage facility in associating containers with handling equipment.

30. A method for determining a location of a container operation with respect to a chassis, comprising
detecting a container operation conducted by a unit of first handling equipment, wherein the first handling equipment can lift and transport a container and the container operations include at least two types: a container pickup operation and a container drop off operation;
identifying a unit of second handling equipment that is involved in the detected container operation, wherein each unit of the second handling equipment has an attached chassis for transporting the container; and
determining the location of the container on the chassis based on a status of presence provided by a container-presence detector installed on the respective unit of the second handling equipment, whereby the location of the given container operation with respect to the chassis is determined as the location of the container on the chassis.

* * * * *